(12) United States Patent
Tsuchiyama et al.

(10) Patent No.: US 6,597,536 B2
(45) Date of Patent: Jul. 22, 2003

(54) MAGNETIC HEAD SLIDER

(75) Inventors: Ryuji Tsuchiyama, Matsudo (JP); Masaaki Matsumoto, Fujisawa (JP); Kiyoshi Hashimoto, Odawara (JP); Xu Junguo, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 09/897,489

(22) Filed: Jul. 3, 2001

(65) Prior Publication Data

US 2003/0011933 A1 Jan. 16, 2003

(30) Foreign Application Priority Data

Dec. 28, 2000 (JP) ........................................ 2000-401316

(51) Int. Cl.$^7$ ................................................. G11B 5/60
(52) U.S. Cl. .................................. 360/235.8; 360/236.6
(58) Field of Search ............................ 360/235.4–237.1

(56) References Cited

U.S. PATENT DOCUMENTS 5,550,693 A * 8/1996 Hendriks ................. 360/236.6

OTHER PUBLICATIONS

Japanese Patent Unexamined Publication No. 6–60329.
Japanese Patent Unexamined Publication No. 6–325530.
Japanese Patent Unexamined Publication No. 5–28682.
U.S. patent No. 5,612,839.
Japanese Patent Unexamined Publication No. 6–52645.
Japanese Patent Unexamined Publication No. 6–150283.

* cited by examiner

Primary Examiner—A. J. Heinz
(74) Attorney, Agent, or Firm—Antonelli, Terry, Stout & Kraus, LLP

(57) ABSTRACT

A magnetic head slider assembly is provided, in which a flying height of the head slider is not changed when a peripheral speed and a yaw angle of the magnetic head slider assembly with respect to a magnetic disk are changed according to the change of a magnetic head slider radial position, so that a difference between flying heights in floating profiles become minimum. The magnetic head slider is provided with two stepped surfaces via a difference portion with respect to a contact surface of an inflow pad or an outflow pad of the magnetic head slider (1), wherein a ratio $\delta s/\delta r$ between a depth $\delta s$ of the first stepped surface and a depth $\delta r$ of the second stepped surface with respect to the contact surface and a ratio $xp/L$ between a length L of the slider in an air stream inflow direction and a distance xp between an air stream inflow end and a dimple position of the slider are respectively set in a range $0.047 \leq \delta s/\delta r \leq 0.364$ and $0.002 \leq xp/L \leq 0.4$, or a range $0.008 \leq \delta s/\delta r \leq 0.025$ and $0.55 \leq xp/L$.

3 Claims, 24 Drawing Sheets

AIR INFLOW DIRECTION

ABS1

ABS11

ABS12

ABS3

ABS4

ABS5

ABS6

ABS7

ABS51

ABS52

ABS53

MAGNETIC HEAD SLIDER

BACKGROUND OF THE INVENTION

1. Field of the Invention

The present invention relates to a magnetic head slider assembly comprising a magnetic head slider and a support body supporting the magnetic head slider and to a magnetic disk apparatus, and more particularly to a magnetic head slider assembly and a magnetic disk apparatus having high recording density and high reliability.

2. Description of the Prior Art

In recent years, the recording density of a magnetic disk apparatus (hereinafter, referred to as the apparatus) becomes high, so that the high reliability and the low floating is required for a head disk interface (HDI). A magnetic head slider is intermittently brought into contact with a medium surface when the floating amount (i.e. flying height) thereof is equal to or less than 10 nm, while it may be continuously brought into contact with the medium surface when the floating amount is equal to or less than 5 nm. In the conventional floating type recording system, the floating amount has been reduced by reducing the size and weight of the slider, however, in the case that the floating amount is equal to or less than 10 nm, a new type of recording system which is different from the floating type becomes required.

In a floating and contacting type recording system described in JP-A-06-060329, two rail surfaces capable of acting as an air bearing are provided on an inflow end of the conventional float recording type of compact slider so as to float the slider, and one contact surface having a magnetic transducer and being hard to act as an air bearing is provided on an outflow end, so that the recording and reproduction are performed while subjecting the contact surface to "the following and contacting movement" with respect to the recording medium surface. In accordance with this recording system, it is possible to reduce the magnetic recording spacing loss between a magnetic transducer gap portion and a magnetic film surface, so that the magnetic recording density can be dramatically improved.

Since the difference between a pressing load and a floating force causes a contact force in the floating contact recording system, it is possible to make the contact force substantially zero by designing the slider so that the minimum floating amount at the outflow end corresponds to a floating amount at a time when the slider starts contacting (namely, a contact start floating amount). However, due to the difference between disk peripheral speeds at the innermost periphery and the outermost periphery of the disk, the floating amount of the slider changes in accordance with the movement of the slider in the disk radial direction, so that the change of the floating amount appears as a change of the contact force, which causes contact vibration and abrasion of the slider. Accordingly, in order to realize a low floating slider having a floating amount equal to or less than 10 nm, it is required to flatten the floating profile, namely the track of the floating amount between the innermost periphery and the outermost periphery of the disk.

Further, in order to effectively increase the recording capacity per one disk, it is necessary to make the liner recording density between the innermost periphery and the outermost periphery of the disk uniform. In order to realize this, it is required to employ a magnetic resistance effective type of head having high sensitivity, of which the reproduction output relates only to the intensity of magnetic field generated by the medium, and to flatten the floating profile in a floating property of the magnetic head slider.

BRIEF SUMMARY OF THE INVENTION

In the case of positioning the head by using the conventional rotary actuator system, the change of the floating amount (flying height) between the disk innermost periphery and the outermost periphery is caused by the change of the peripheral speed due to the difference of radial positions of the innermost and outermost peripheries, and by the change of a yaw angle showing an air inflow angle.

A magnetic head slider of the conventional floating type recording system described in JP-A-06-325530 is brought into contact with the medium surface when the disk stops, and comprises a floating surface capable of acting as an air bearing and a stepped surface provided in an air inflow direction via a difference portion. A depth $\delta s$ of the difference portion is less than 500 nm, and a ratio W/L between a length L of the slider in the air inflow direction and a length W in a direction perpendicular to the air inflow direction is equal to or less than 0.3. This structure satisfies the floating characteristic in which the floating amount is not changed with the change of the peripheral speed, however, it is not possible to satisfy the floating characteristic in which the floating amount does not change with the change of the yaw angle due to the difference of radial positions of the innermost and outermost peripheries.

A magnetic head slider of a conventional floating type recording system described in JP-A-05-028682 is structured such that a pair of rails constituted by two surfaces which comprise a flat surface portion inclined in a side of an air stream inflow end and a flat surface portion extending to an outflow end and may act as an air bearing are provided in parallel along both sides. The slider is arranged so that a load supporting point is shifted to the inflow side from the center in the air stream direction of the slider, and a moment applying means is provided for correcting the unbalance of the floating force caused by the shift of the load supporting point. For applying the moment, a slider mounting surface of a gimbal is previously set to have an inclined angle, or a rail width at the air stream inflow end side is structured so as to be wider than a rail width at the outflow end side. In accordance with these structures, the change of the floating amount at the outflow end side of the slider with respect to the load change becomes small.

A magnetic head slider of the conventional floating contact type recording system described in U.S. Pat. No. 5,612,839 is structured such that a pair of rails constituted by two surfaces which comprise a flat surface portion inclined in a side of an air stream inflow end and a flat surface portion extending to an outflow end and may act as an air bearing are provided in parallel along both sides. Further, in order to reduce the damage on the magnetic recording medium surface by contact, a corner of the outflow end of the slider rail, which forms a contact surface, is rounded so as to reduce the contact stress. Furthermore, in the case of separating the floating force balancing with the load applied from the support body into a positive pressure generated in a direction of floating the slider and a negative pressure generated in a direction of moving close to the medium surface, a distance x1 between the center position of the positive pressure and an air stream inflow end position of the slider, a distance xp between a position of a load application point and the air stream inflow end position, a slider attitude angle $\theta$ in a pitch direction of the slider, and a total length L of the slider in a longitudinal direction satisfy the following relational expression.

$$0.05 \leq x1/L \leq 0.49$$

$$0.05 \leq xp/L \leq 0.49$$

$1.05 \leq xp/x1 \leq 1.2$ $0.0003 \text{ deg} \leq \theta \leq 0.0006 \text{ deg}$ In accordance with the structure in which the load supporting point is shifted to the position in the side of the air stream inflow end of the slider, it is possible to reduce the contact force at a time of contacting. However, it is impossible to obtain the floating characteristic that the floating amount is not changed with respect to both of the peripheral speed change due to the difference of the radial positions between the innermost and outermost peripheries and the change of the yaw angle showing the air stream inflow angle.

In the conventional magnetic head slider mentioned above, since it is not possible to simultaneously satisfy the floating characteristic in which the floating amount is not changed with respect to the change of peripheral speed due to the difference of the radial positions between the innermost and outermost peripheries and the change of the yaw angle showing the air stream inflow angle and it is not possible to reduce the difference of the floating amounts in the floating profile, it is impossible to reduce the contact force change at a time of floating and contacting between the innermost periphery and the outermost periphery of the disk, and to make the liner recording density between the innermost periphery and the outermost periphery of the disk constant.

An object of the present invention is to simultaneously satisfy a floating characteristic in which the floating amount is not changed in accordance with the change of the peripheral speed due to the difference of radial positions of the innermost and outermost peripheries of a disk, and a floating characteristic in which the floating amount is not changed in accordance with the change of a yaw angle corresponding to an air stream inflow angle, thereby reducing the difference of the floating amount in a floating profile.

The inventors have achieved the present invention as a result of executing experiments and calculations on the assumption of various cases of a shape of a floating surface, a height of a stepped surface, a magnitude of the xp mentioned above and the like with respect to the magnetic head slider provided with two stages of stepped surfaces, and studying the obtained results. In this case, the inventors have achieved the present invention by studying so as to set the difference of the floating amount to be equal to or less than 0.8 nm in the case of the relation of $xp/L \leq 0.5$, and set the difference of the floating amount to be equal to or less than 3 nm in the case of the relation of $0.5 < xp/L$.

That is, the object mentioned above can be achieved by a magnetic head slider assembly comprising a magnetic head slider provided with an inflow pad (i.e. a front pad) and an outflow pad (i.e. a leading pad) on an opposing side thereof to a magnetic disk surface, and with two stepped surfaces formed on the opposing side via a difference portion and disposed in a direction apart from the magnetic disk surface with respect to contact surfaces of the inflow pad and the outflow pad; and a support body for supporting the magnetic head slider on the magnetic surface, which is provided with a dimple for applying a load to the magnetic head slider, wherein a ratio $\delta s/\delta r$ between a depth $\delta s$ from the contact surfaces to the first stepped surface and a depth $\delta r$ from the contact surfaces to the second stepped surface is set in a range satisfying a condition shown by $0.047 \leq \delta s/\delta r \leq 0.364$, and a ratio $xp/L$ between a length L of the magnetic head slider in an air stream inflow direction and a distance xp between an air stream inflow end of the magnetic head slider and a dimple position is set in a range satisfying a condition shown by $0.002 \leq xp/L \leq 0.4$.

The ranges of the ratios $\delta s/\delta r$, and $xp/L$ may be set to $0.008 \leq \delta s/\delta r \leq 0.025$ and $0.55 \leq xp/L$.

DETAILED DESCRIPTION OF THE INVENTION

Figure 1:
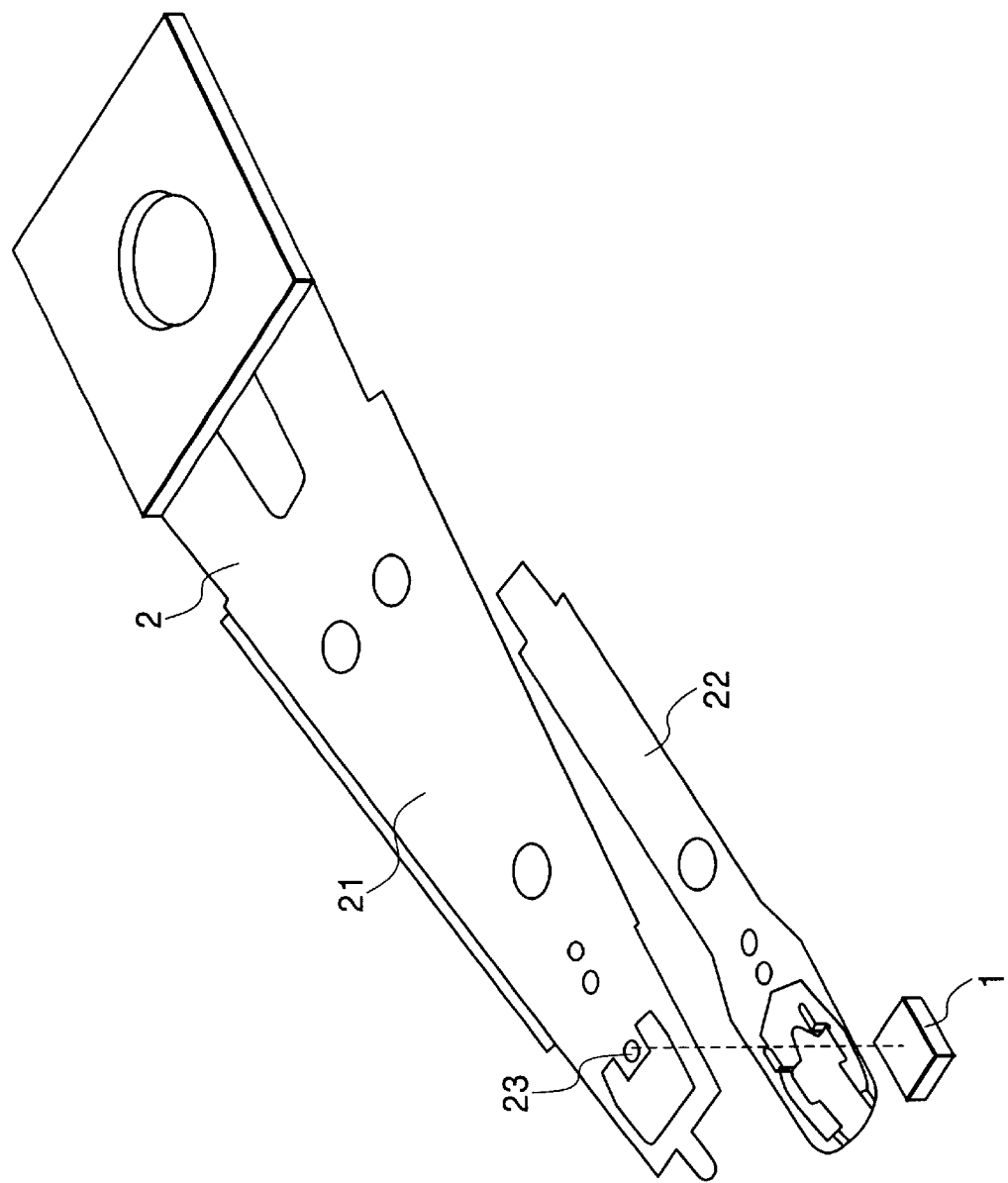
FIG. 1 is a three-dimensional perspective view of a magnetic head slider assembly to which the present invention is applied.
Figure 2:
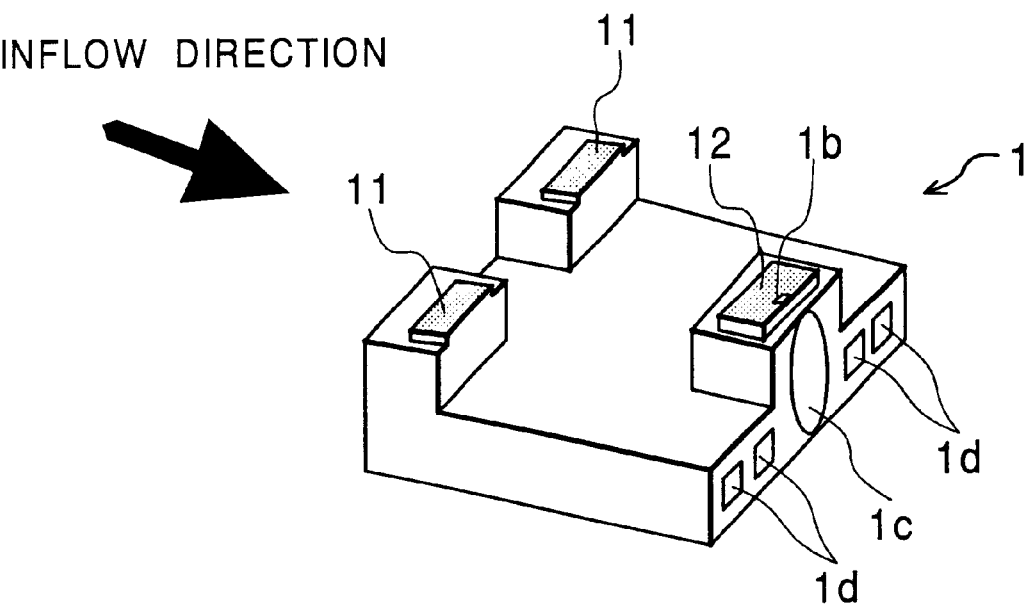
FIG. 2 is a three-dimensional perspective view showing a magnetic head slider in accordance with a first embodiment of the present invention.

A description will be given below of a first embodiment in accordance with the present invention with reference to FIG. 1. FIG. 1 is a three-dimensional perspective view of a magnetic head slider 1 and a support body 2 thereof in accordance with the first embodiment of the present invention. FIG. 2 shows a three-dimensional perspective view of the magnetic head slider (hereinafter, referred to as a slider) 1 shown in FIG. 1.

The slider 1 is provided with two (or a pair of) pads 11 (hereinafter, referred to as an inflow pad) capable of forming an air bearing surface in an air inflow side, and one pad 12 (an outflow pad) capable of forming the air bearing surface in an air outflow side. Two inflow pads 11 are formed in the same rectangular shape and are arranged at an interval so that respective longer sides are perpendicular to an air inflow direction and the longer sides on the air inflow side are disposed in a straight line. The outflow pad 12 is also formed in a rectangular shape, and is arranged at a position so that longer side lines thereof are disposed in parallel to the longer side lines of the inflow pads 11, and in an air stream downward side between the inflow pads 11.

A recording and reproducing element 1b constituted by an exposed portion of a MR device in a reproducing MR head and a gap portion of a recording electromagnetic induction type magnetic head is provided in an outflow end of the outflow pad 12, and a magnetic head 1c and a connecting terminal 1d are provided on a side surface in the outflow end of the slider 1.

Figure 3:
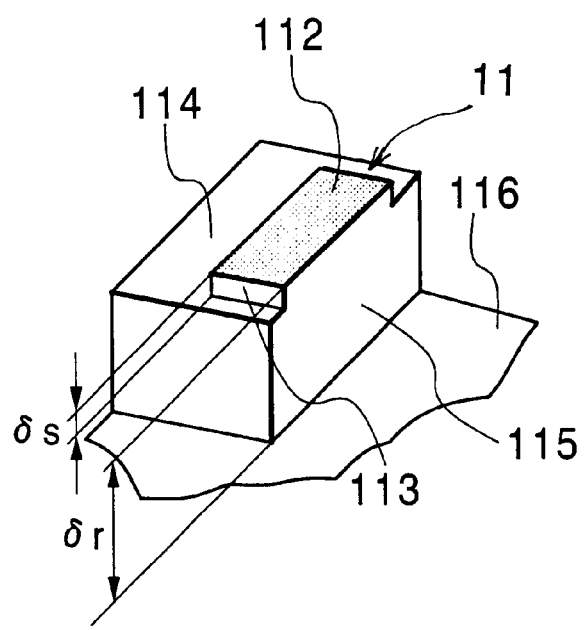
FIG. 3 is a three-dimensional perspective view showing an inflow pad of the magnetic head slider shown in FIG. 2 in an enlarged manner.
Figure 4:
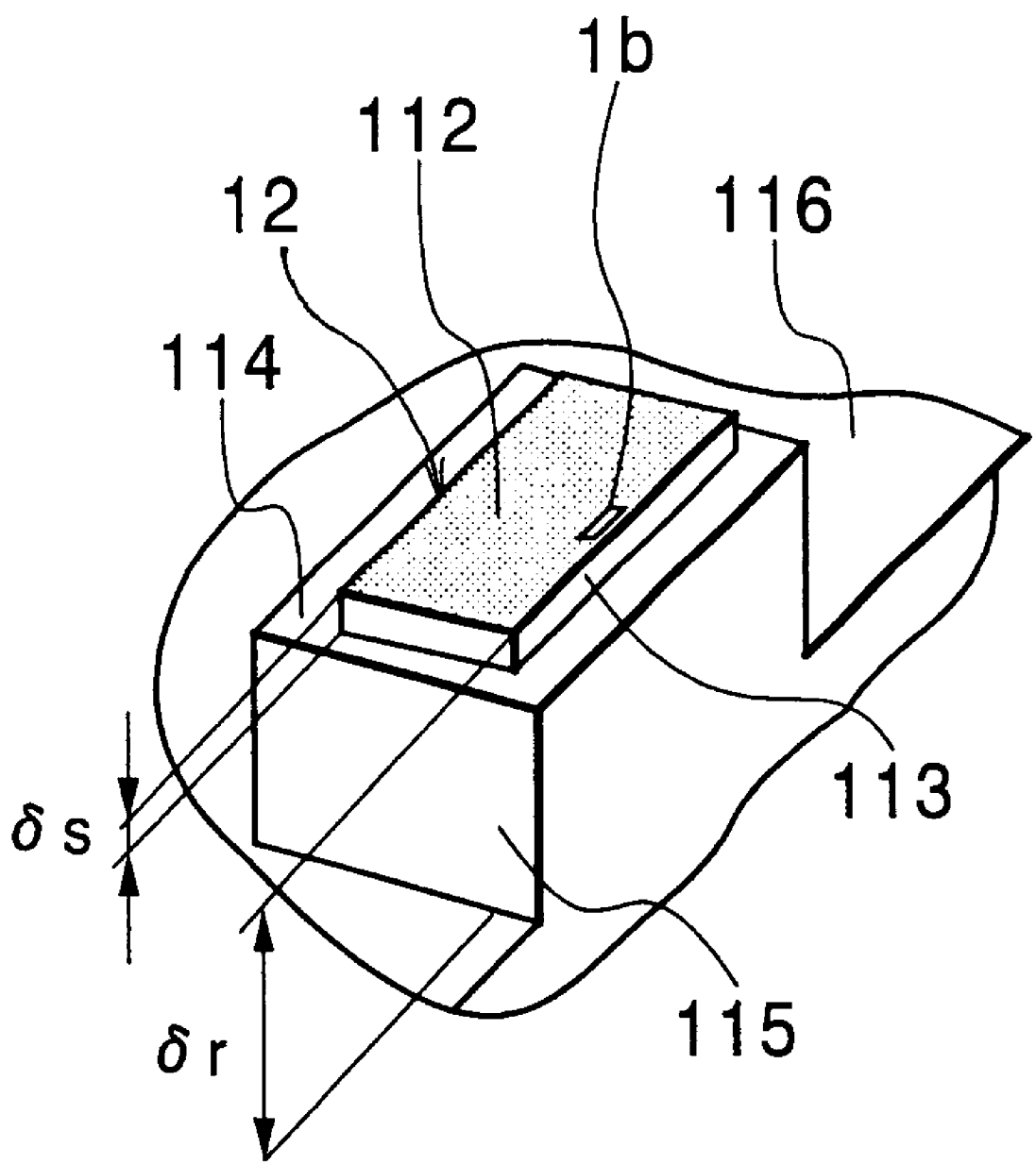
FIG. 4 is a three-dimensional perspective view showing an outflow pad of the magnetic head shown in FIG. 2 in an enlarged manner.

FIGS. 3 and 4 show a positional relation in a height direction between the slider main body and the inflow pad 11, or the outflow pad 12 in the slider 1. The slider 1 is provided with a pad surface 112 (hereinafter, referred to as a contact surface) of the inflow pad 11 which contacts with a medium surface when a disk stops, and two stepped surfaces constituted by a first stage of stepped surface 114 (a stepped surface) provided via a difference portion 113 in an upstream side and lateral sides in an air inflow direction and a second stage of stepped surface 116 (a recess surface) provided via a difference portion 115 in a downstream side in the air inflow direction of the contact surface 112. In the same manner, the first stage of stepped surface 114 (the stepped surface) is provided in the periphery of the pad surface 112 (a contact surface), which contacts with the medium surface when the disk stops, of the outflow pad 12 via the difference portion 113, and the second stage of stepped surface 116 (the recess surface) is arranged via the difference portions 115 in an upstream side and lateral sides in the air inflow direction of the stepped surface 114 (the stepped surface). In this case, the first stage of stepped surface 114 provided via the difference portion 113 from the contact surface 112 of the inflow pad 11 is cut in a portion between a pair of inflow pads 11, and the portion therebetween forms the second stage of stepped surface 116 (the recess surface).

Symbols δs and δr show a depth (a step depth or a shallow depth) of the first stage of stepped surface 114 with respect to the pad surface 112 and a depth (a recess depth) of the second stage of stepped surface 116 with respect to the pad surface 112 respectively.

Figure 5:
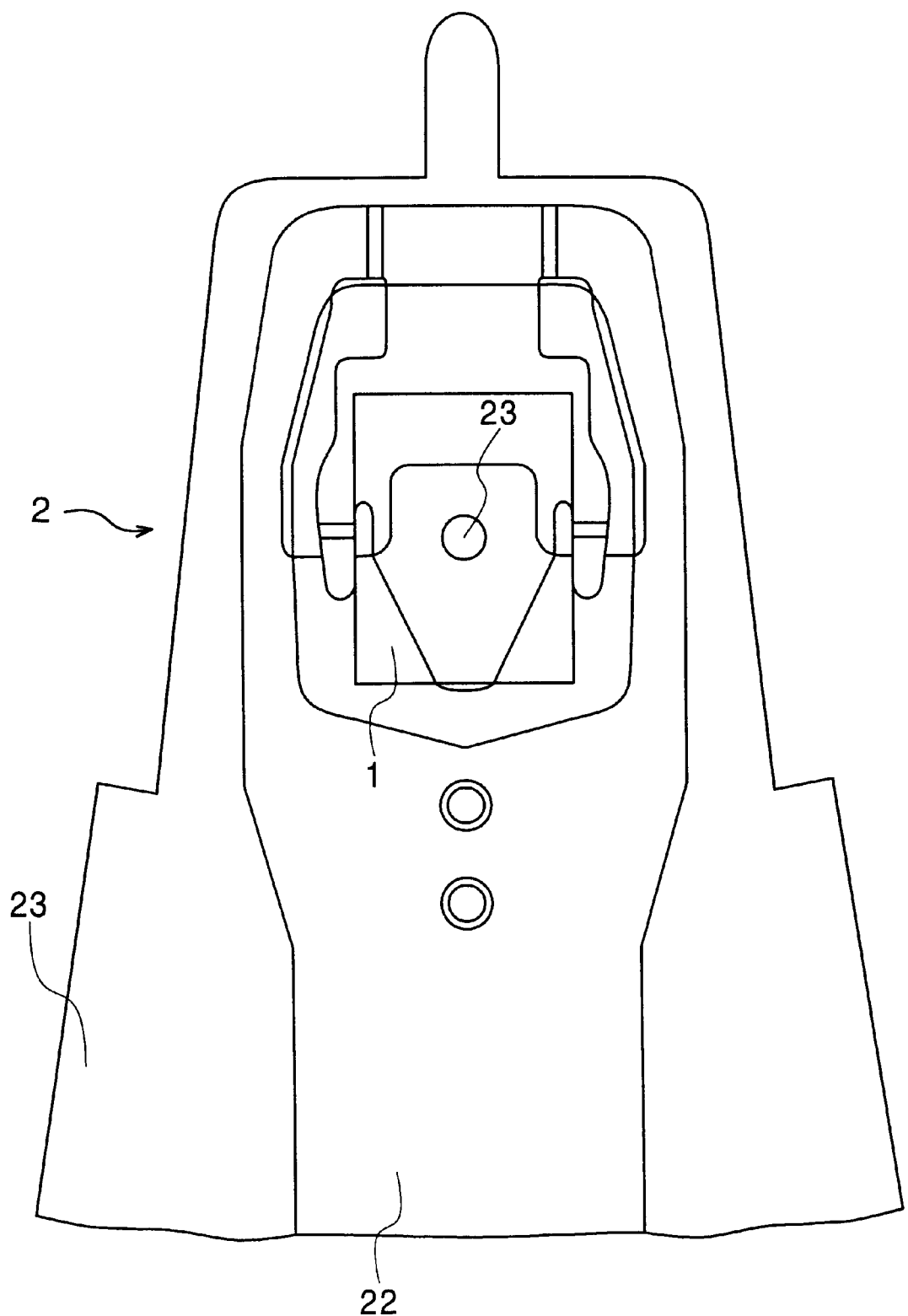
FIG. 5 is a plan view of the magnetic head slider assembly shown in FIG. 1.

FIG. 5 is a plan view of the support body 2 shown in FIG. 2. The support body 2 is constituted by a beam portion 21 for a load, a gimbal portion 22 and a projection portion for a load (hereinafter, referred to as a dimple) 23.

Figure 6A:
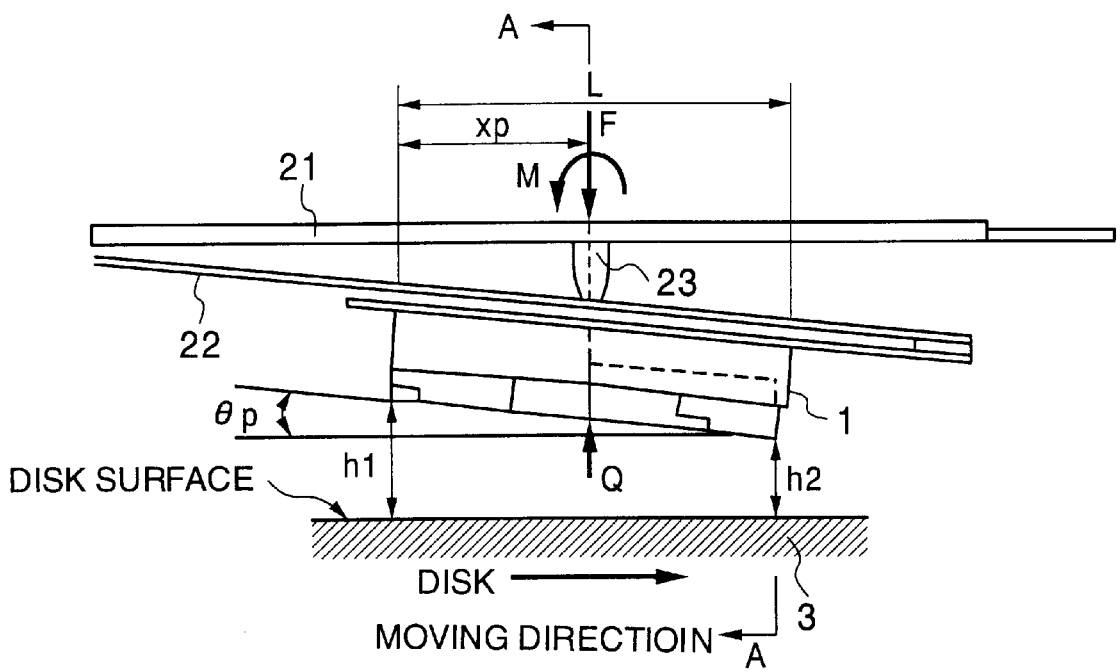
FIGS. 6A and 6B are side elevational views of the magnetic head slider in accordance with the first embodiment of the present invention at a time of moving in a floating manner.
Figure 6B:
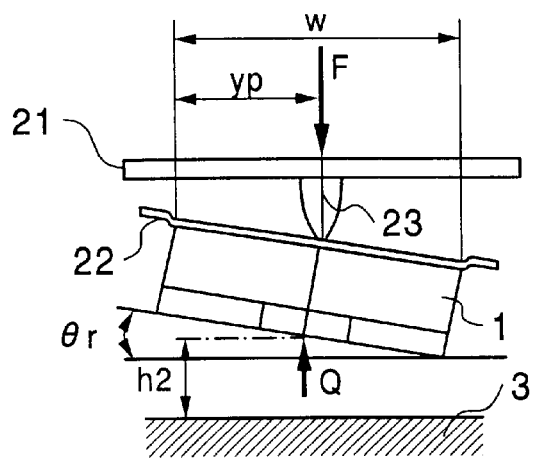

FIG. 6A is a side elevational view of the slider in accordance with the present embodiment at a time of moving in a floating state. FIG. 6B is a view along a line A—A in FIG. 6A. The dimple 23 is provided as a load application point for applying a load F pressed from the load beam portion 21 to the slider 1. Further, the point is provided so that a restoring force is applied to a motion having three freedoms in translational (vertical), pitch (longitudinal) and roll (seek) directions of the slider with setting the load application point to a supporting point.

Figure 17:
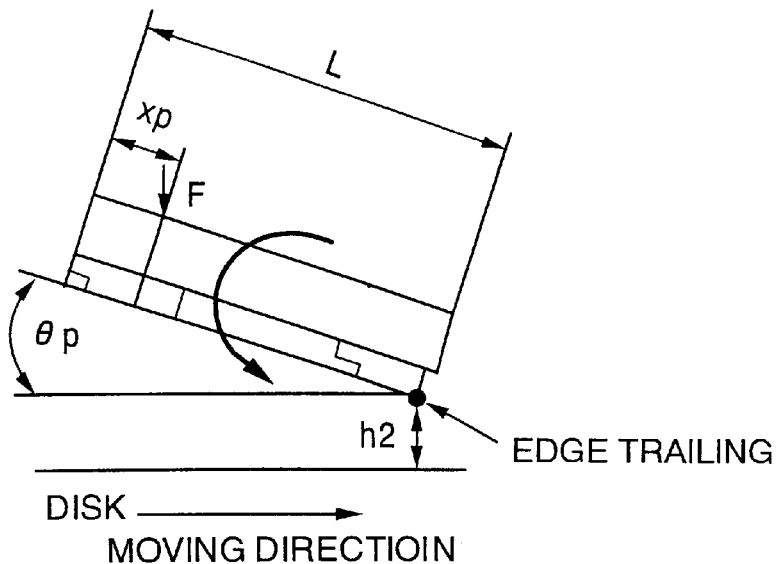
FIG. 17 is a side elevational view for describing an effect of the magnetic head slider assemblies in accordance with the first and second embodiments of the present invention.

A position (Xp, Yp) of the dimple 23, as a load application point, is expressed as non-dimensional values of Xp=xp/L with respect to the pitch direction and Yp=yp/w with respect to the roll direction, respectively. In this case, xp is a distance between the inflow end of the slider and the dimple 23, yp is a distance between an end of the slider side surface and the dimple 23, L is a length of the slider in a longitudinal direction (in an air inflow direction), and w is a length of the slider in a short side line direction (a direction perpendicular to the air inflow direction). In FIG. 6A, it is described in such a manner as to measure in parallel to the disk surface, however, the size is obtained by measuring as shown in FIG. 17.

Figure 7:
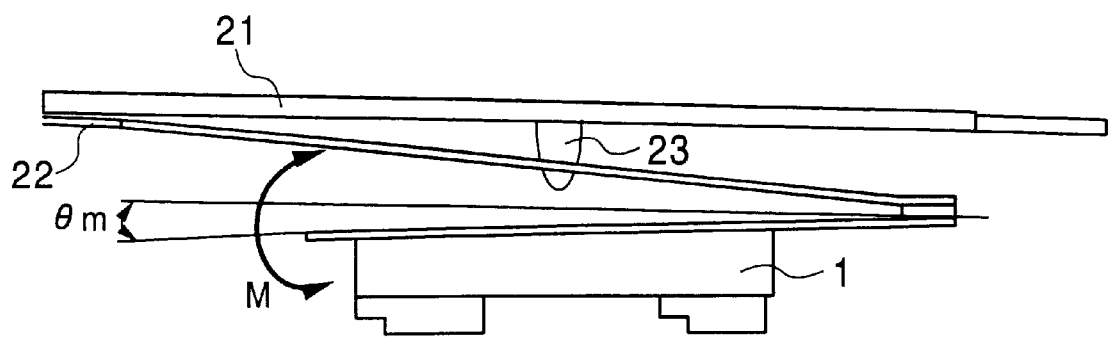
FIG. 7 is a side elevational view of the magnetic head slider assembly in accordance with the first embodiment of the present invention.

A load moment M is applied to the support body 2 so that a pitch angle θp becomes smaller in a pitch direction around the dimple 23. The pitch angle θp corresponds to an angle formed by the disk surface and the contact surface in a cross section which is perpendicular to the disk surface and parallel to the air inflow direction. A means for applying the load moment M around the dimple 23 bends the gimbal portion 22 at an angle θm, as shown in FIG. 7. The angle θm corresponds to an angle formed by the contact surface and the disk surface form in a cross section which is perpendicular to the disk surface and parallel to the air inflow direction in a disk stopping state, and is set, as illustrated, so that the interval between the contact surface and the disk surface is increased as moving close to the downstream side in the air inflow direction.

The slider 1 is dynamically stably floated while keeping the pitch attitude angle θp, the roll attitude angle θr, the inflow end floating amount h1 and the outflow end floating amount h2 constant, which express the floating attitude in the pitch direction and the roll direction, so that the pressing load F, the load moment M and an aerodynamically generated floating force Q are balanced at a position of the dimple 23. A relational expression between the dimple position Xp and the load moment M is expressed by the following formula.

$Xp=Xp0-M/(FL)$

In the formula, Xp0 (=xp0/L) expresses the position of the dimple 23 at a time of M=0.

Figure 8:
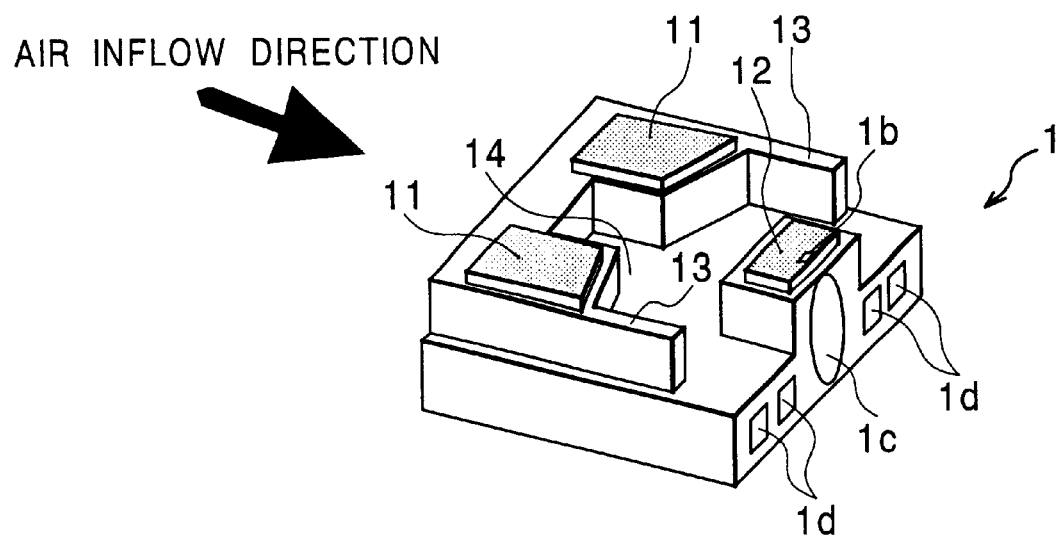
FIG. 8 is a three-dimensional perspective view showing a magnetic head slider in accordance with a second embodiment of the present invention.

FIG. 8 is a three-dimensional perspective view of the magnetic head slider in accordance with the second embodiment of the present invention. The slider 1 is constituted by a pair of inflow pads 11 formed in an inflow side, an outflow pad 12 formed in an outflow side and a pair of side rails 13 formed in both sides of the slider along an air inflow direction. A recording and reproducing device 1b constituted by an exposed portion of a MR device in a reproducing MR head and a gap portion of a recording electromagnetic induction type magnetic head is provided in an outflow end of the outflow pad 13, and a magnetic head 1c and a connecting terminal 1d are provided on a side surface of the outflow end of the slider 1.

Figure 9:
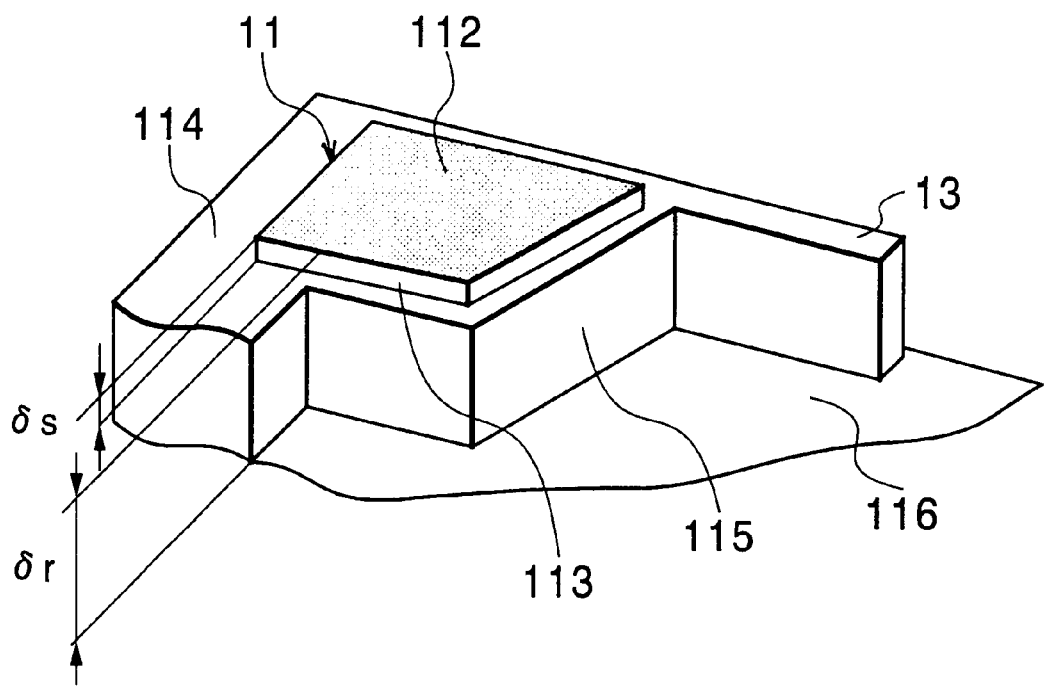
FIG. 9 is a three-dimensional perspective view showing an inflow pad and a side rail of the magnetic head slider shown in FIG. 8 in an enlarge manner.
Figure 10:
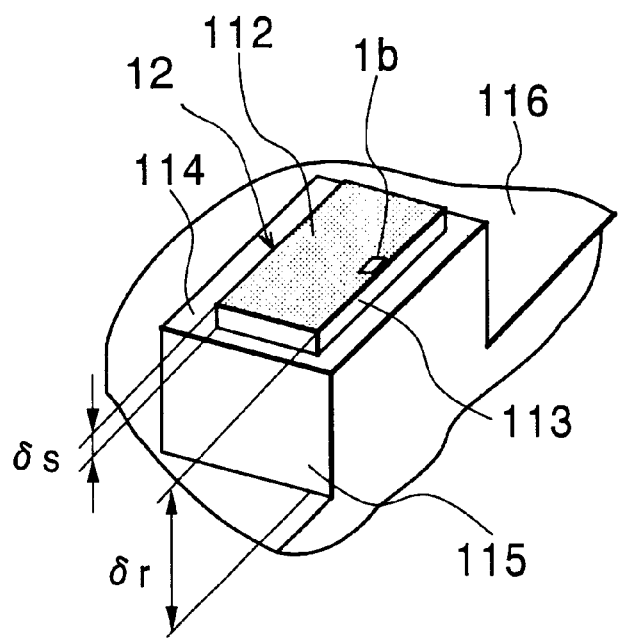
FIG. 10 is a three-dimensional perspective view showing an outflow pad of the magnetic head slider shown in FIG. 8 in an enlarged manner.

FIGS. 9 and 10 show the inflow pads 11, the side rails 13 and the outflow pad 12 of the magnetic head slider shown in FIG. 8. These are constituted by a pad surface 112 (hereinafter, referred to as a contact surface) brought into contact with a medium surface when a disk stops, and two stages having two stepped surfaces comprising a first stepped surface 114 (a stepped surface) provided via a difference portion 113 in an air inflow direction and a second stepped surface 116 (a recess surface) provided via a difference portion 115. Symbols δs and δr show a depth (a step depth) of the first stage of stepped surface 114 with respect to the pad surface 112 and a depth (a recess depth) of the second stage of stepped surface 116 with respect to the pad surface 112 respectively.

The present embodiment is different from the first embodiment mentioned above in a point that the shape of the inflow pad 11 is a shape obtained by inclining one of short rectangular side lines, another short side line is directed to an upstream side in the air inflow direction, and longer side lines are arranged so as to be directed toward an outer side of the slider and along the air inflow direction, a point that the stepped surface 114 is extended along a slider outer edge in the air inflow direction at a predetermined width, whereby a pair of side rails 13 are formed, and a point that the stepped surfaces 114 between two inflow pads 11 are connected at the air inflow side end portion without being detached, whereby a negative pressure pocket (surface area producing negative pressure force) 14 is formed between the two inflow pads 11. The structure around the outflow pad 12 is the same as that of the first embodiment mentioned above.

Figure 11:
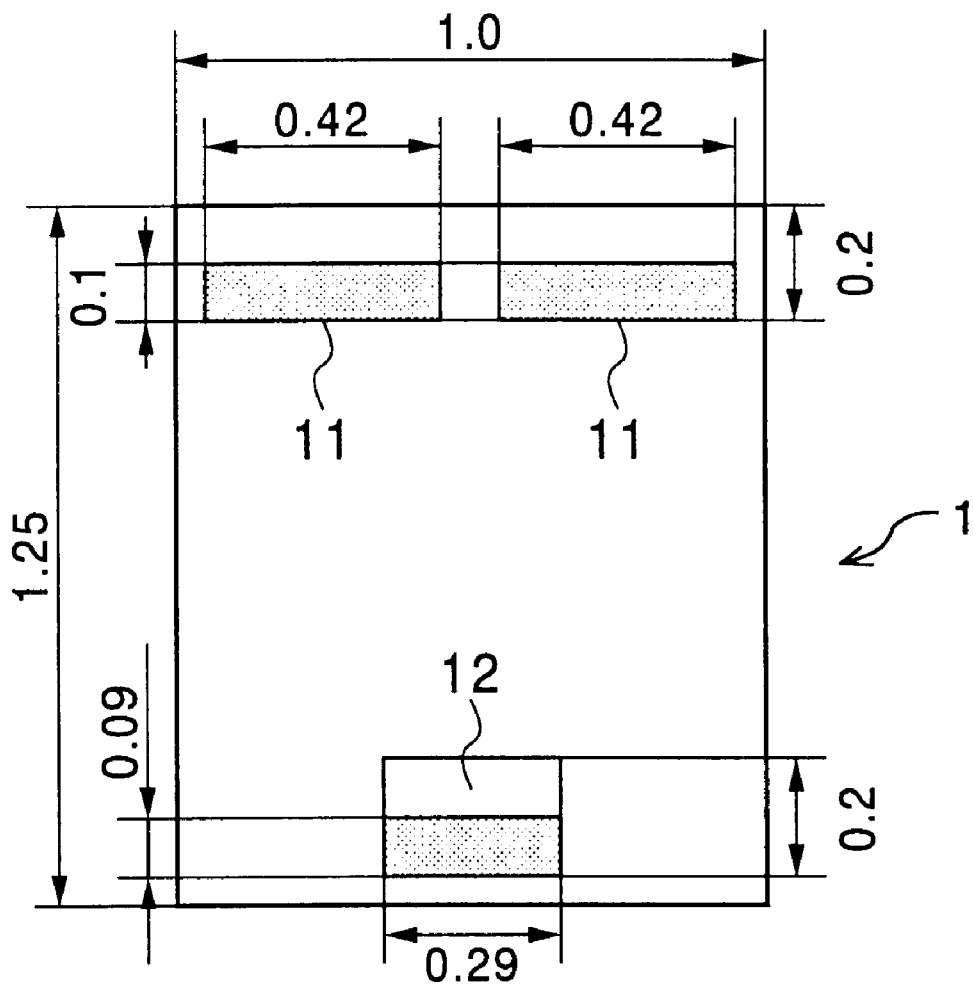
FIG. 11 is a plan view showing a floating surface shape ABS1 of the magnetic head slider shown in FIG. 2.

Next, a description of a dimple position, a step depth (i.e. a shallow depth) δs and a recess depth δr of the magnetic head slider assembly in accordance with the first embodiment of the present invention will be given. FIG. 11 shows a floating surface shape (hereinafter, referred to as ABS1) of the magnetic head slider in accordance with the first embodiment of the present invention.

Figure 12A:
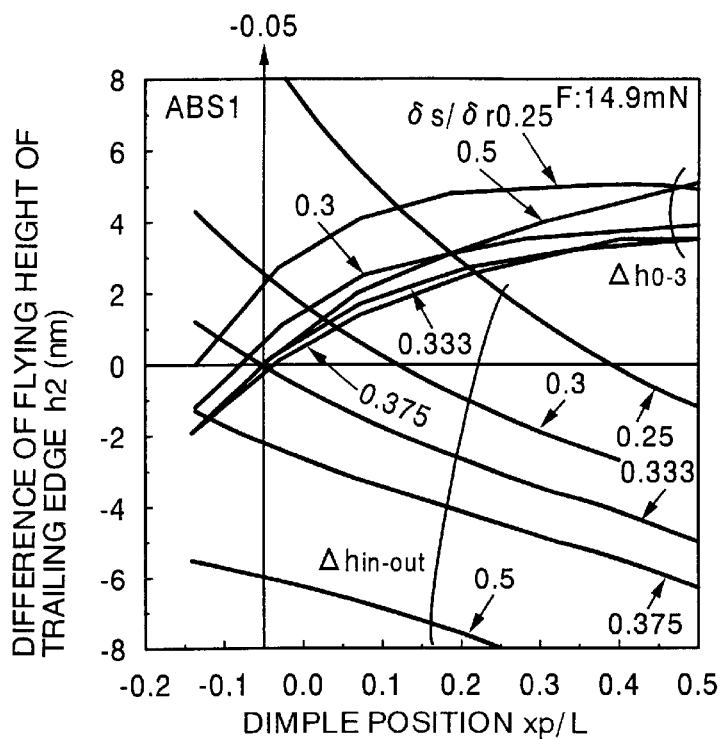
FIGS. 12A and 12B are graphs showing a floating characteristic of the floating surface shape ABS1 shown in FIG. 11 in the case that a pressing load F is 14.9 mN.
Figure 12B:
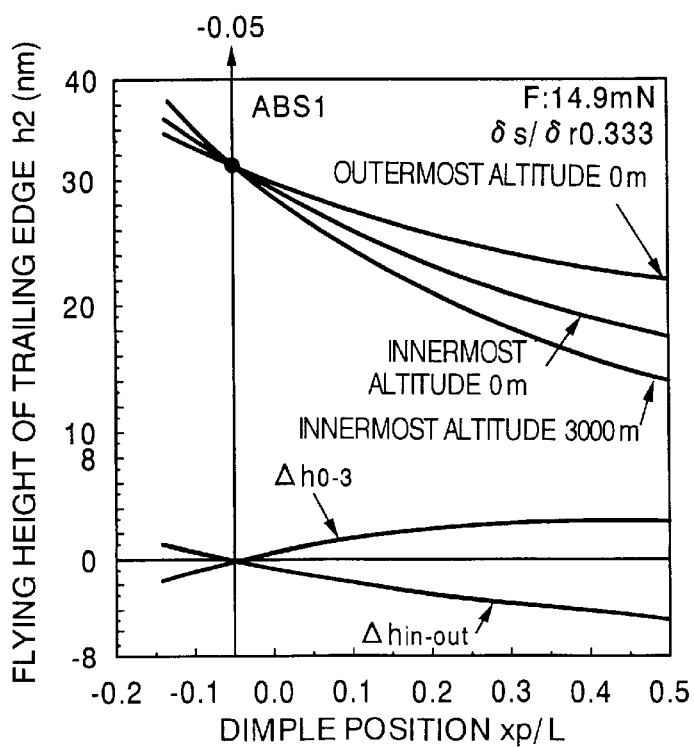

FIG. 12A shows a calculation result of a difference in floating amounts Δhin-out of the floating profile with respect to the dimple position Xp (≦0.5) and a reduction in floating amount Δh0-3 with respect to the dimple position Xp (≦0.5) due to an atmospheric change around the slider, in the case that a ratio δs/δr between the step depth δs and the recess depth δr is changed in the values of 0.25, 0.3, 0.333, 0.375 and 0.5, under a condition that the pressing load F and the dimple position Yp are uniformly set to 14.9 mN and 0.5 respectively, and the floating surface shape ABS1 is employed. In this case, Δhin-out corresponds to a difference between a distance from the height 0 m to an outflow end floating amount hin0 under a condition of the innermost periphery and a distance from the height 0 m to an outflow end floating amount hout0 under a condition of the outermost periphery, and Δh0-3 corresponds to a difference between the hin0 and an outflow end floating amount hin3 under a condition of the height 3000 m and the innermost periphery. FIG. 12B particularly shows hin0, hout0 and hin3 in the state of δs/δr=0.333.

Figure 13A:
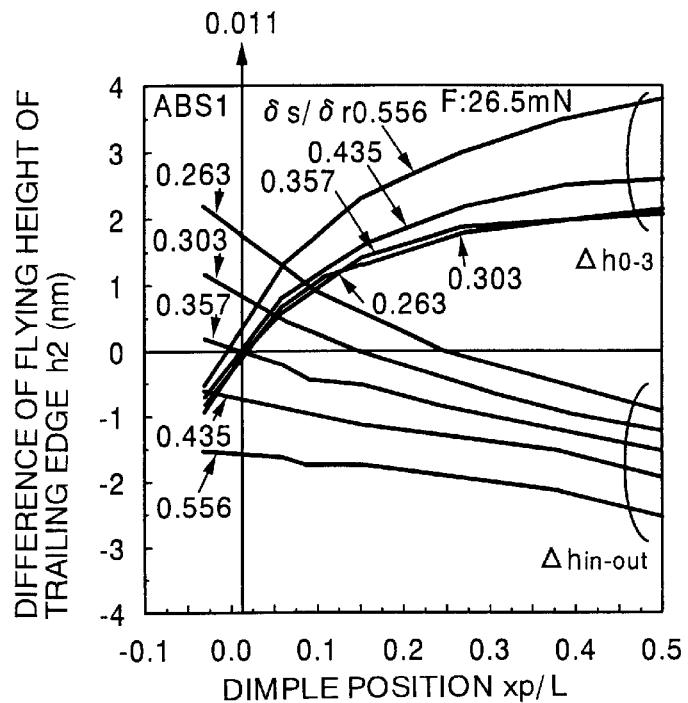
FIGS. 13A and 13B are graphs showing a floating characteristic of the floating surface shape ABS1 shown in FIG. 11 in the case that the pressing load F is 26.5 mN and a dimple position xp/L is between −0.1 and 0.5.
Figure 13B:
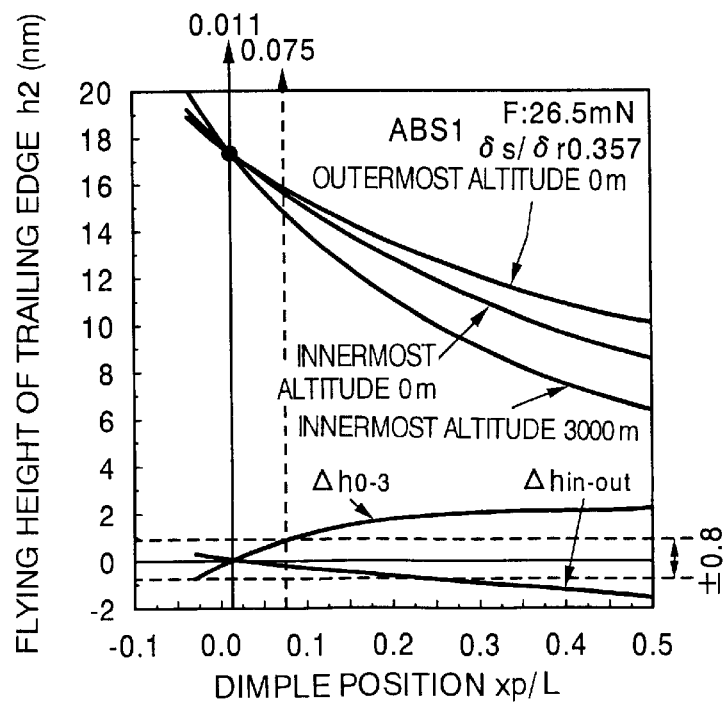

FIG. 13A shows a calculation result of a difference of floating amount Δhin-out of the floating profile with respect to the dimple position Xp (≦0.5), and a reduction of floating amount Δh0-3 due to an atmospheric change around the slider, in the case that a ratio δs/δr between the step depth δs and the recess depth δr is changed in the values 0.263, 0.303, 0.357, 0.435 and 0.556, under a condition that the pressing load F and the dimple position Yp are uniformly set to 26.5 mN and 0.5 respectively, by using the floating surface shape ABS1. FIG. 13B shows hin0, hout0 and hin3 particularly in the state of δs/δr=0.357.

In accordance with FIGS. 12A, 12B, 13A and 13B, when the dimple position Xp is provided in the inflow end side, a difference Δhin–out between hin0 and hout0 is increased from a negative value to a positive value while a difference Δh0–3 between hin0 and hin3 is reduced from a positive value to a negative value. Further, it is found that the differences simultaneously become zero when the relation Xp=−0.05 and δs/δr=0.333 is established in the case that the pressing load F is 14.9 mN, and when the relation Xp=0.011 and δs/δr=0.357 is established in the case that the pressing load F is 26.5 mN. This information means that the dimple position Xp and the ratio δs/δr between the step depth δs and the recess depth δr by which Δhin–out and Δh0–3 becomes simultaneously zero with respect to the optional floating surface are definitely determined. Further, in the case that absolute values of Δhin–out and Δh0–3 are allowed between zero and 0.8 nm, the dimple position Xp becomes from 0.011 to 0.075, as shown in FIG. 13B, namely becomes close to the center of mass 0.5.

Figure 14A:
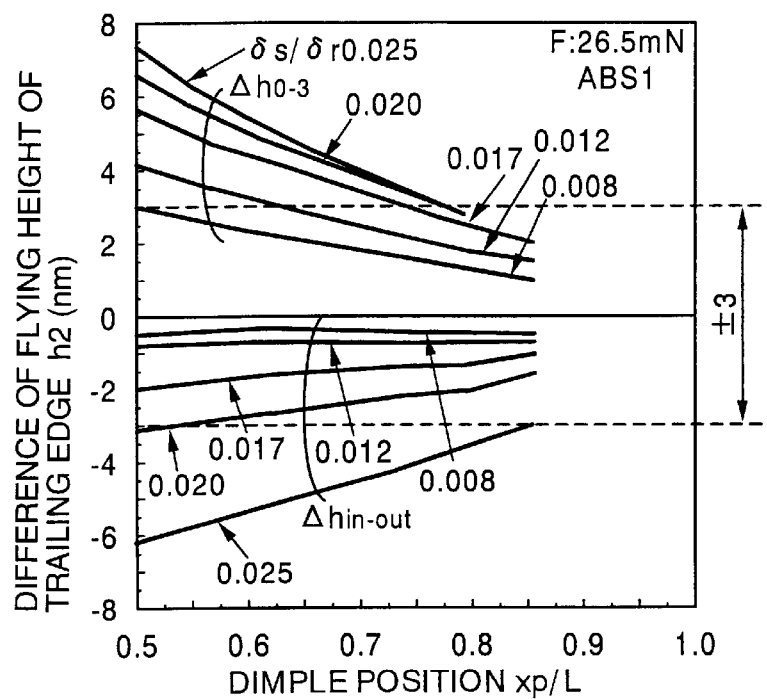
FIGS. 14A and 14B are graphs showing a floating characteristic of the floating surface shape ABS1 shown in FIG. 11 in the case that the pressing load F is 26.5 mN and a dimple position xp/L is between 0.5 and 1.0.
Figure 14B:
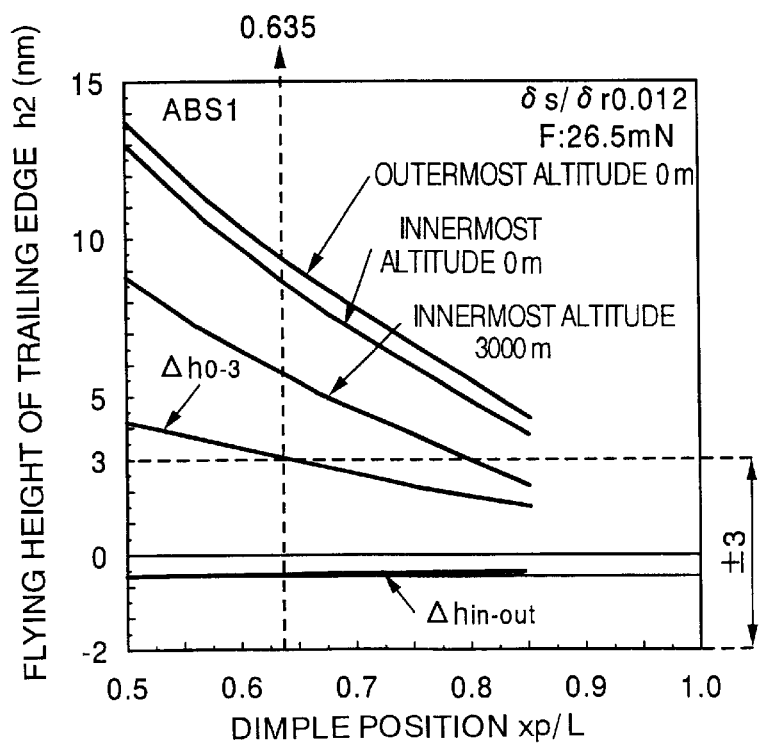

FIG. 14A shows calculation results of a difference of floating amount Δhin–out of the floating profile with respect to the dimple position Xp, and a reduction of floating amount Δh0–3 due to an atmospheric change around the slider, in the case that a ratio δs/δr between the step depth δs and the recess depth δr is changed in the values of 0.008, 0.012, 0.017, 0.02 and 0.025 under a condition that the pressing load F and the dimple position Yp are uniformly set to 26.5 mN and 0.5 respectively and the ABS1 in accordance with the first embodiment is employed. FIG. 14B shows hin0, hout0 and hin3 particularly in the state of δs/δr=0.012.

In accordance with FIGS. 14A and 14B, it is found that, even when the dimple position Xp is provided in the outflow end side, a difference Δhin–out between hin0 and hout0 and a difference Δh0–3 between hin0 and hin3 are reduced. However, Δhin–out and Δh0–3 do not simultaneously become zero as shown in FIGS. 12A, 12B, 13A and 13B. As shown in FIG. 14B, when the relation Xp=0.635 is established, absolute values of Δhin–out and Δh0–3 become simultaneously equal to or less than 3 nm. Accordingly, in order to simultaneously make the absolute values of Δhin–out and Δh0–3 equal to or less than 3 nm, the relation Xp≧0.635 is the essential condition. Further, since it is possible to make the outflow end floating amount h2 small without reducing the area of the outflow pad 12 when the dimple position Xp is provided in the outflow end side, it is possible to increase a rigidity of an air film of the outflow pad 12 provided with the recording and reproducing device 1d in comparison with the rigidity of the air film in a pair of inflow pads 11, so that a stable floating can be achieved. Further, since it is possible to increase a pitch attitude angle θp, it is possible to reduce a true contact area and contact force at a time when the outflow end of the outflow pad 12 is brought into contact with the medium surface, and to prevent the slider from vibrating in a contact manner. Further, since the outflow end floating amount h1 can be increased, it is possible to prevent the slider from being inclined forward, whereby the inflow pad is brought into contact with the medium surface. Further, since the negative pressure is small, it is possible to easily load and unload. It is possible to prevent the magnetic spacing from being increased by setting the inflow end floating amount hi to a value between 125 nm and 250 nm and setting the pitch attitude angle θp to a value between 5 nrad and 100 nrad.

Figure 15:
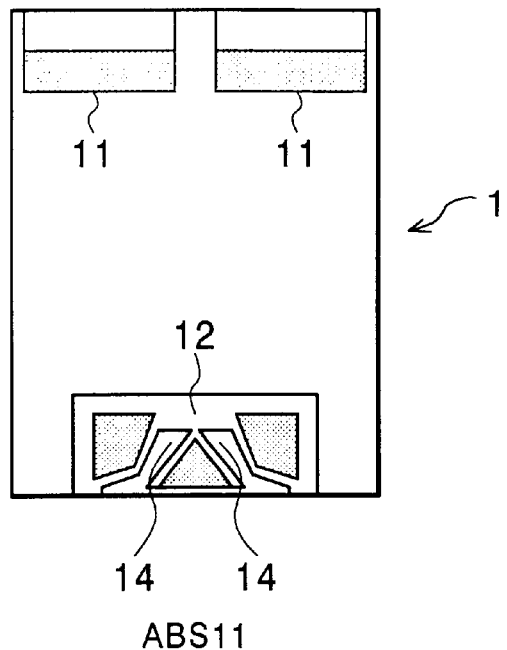
FIG. 15 is a plan view showing another floating surface shape ABS11 of the magnetic head slider in accordance with the first embodiment of the present invention.

FIG. 15 shows the other floating surface shape (ABS11) of the magnetic head slider in accordance with the first embodiment of the present invention. The ABS11 of the first embodiment 1 is provided with the negative pressure pocket 14 for generating a negative pressure in the outflow pad 12. Due to the negative pressure, it is possible to further increase the rigidity of the air film of the outflow pad 12 in comparison with the rigidity of the air film in a pair of inflow pads 11 and thus, it is possible to achieve a more stable floating travel in comparison with the ABS1 of the first embodiment.

Figure 16:
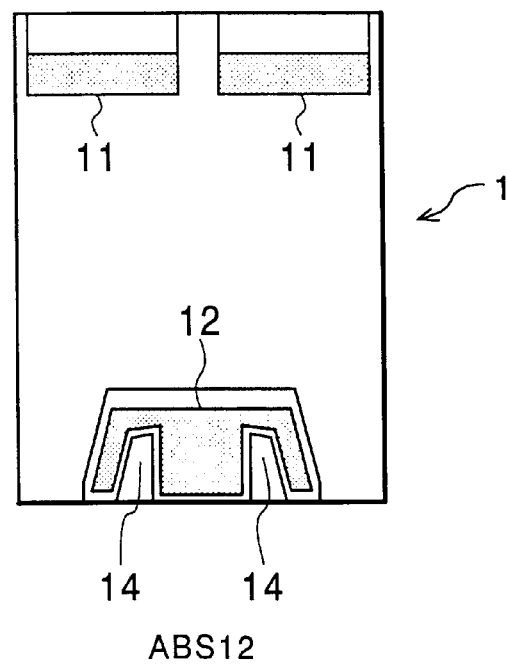
FIG. 16 is a plan view showing the other floating surface shape ABS12 of the magnetic head slider in accordance with the first embodiment of the present invention.

FIG. 16 shows the other floating surface shape (ABS12) of the magnetic head slider in accordance with the first embodiment of the present invention. The ABS12 of the first embodiment 1 is structured such that a negative pressure generated in the negative pressure pocket 14 is increased in comparison with the ABS11 of the first embodiment, so that it is possible to achieve a more stable floating travel in comparison with the ABS11 of the first embodiment.

A description will be given below of a mechanism of an effect of the magnetic head slider assembly in accordance with the first and second embodiments of the present invention with reference to FIG. 17. In the case that an atmospheric pressure in the periphery of the slider is reduced or the case that conditions of the circumstance of the slider (e.g. the peripheral speed and the yaw angle etc.) are changed when the slider is innermost position and outermost position, the pitch attitude angle θp of the slider 1 is changed. In the case that an instantaneous center position of rotation at a time when the pitch attitude angle is changed is the outflow end position, the outflow end floating amount h2 is not changed. The slider 1 changes the dimple position xp and the value δs/δr and controls the attitude angle, thereby providing the instantaneous center position of rotation at the outflow end position so as not to change the outflow end floating amount h2.

Figure 18:
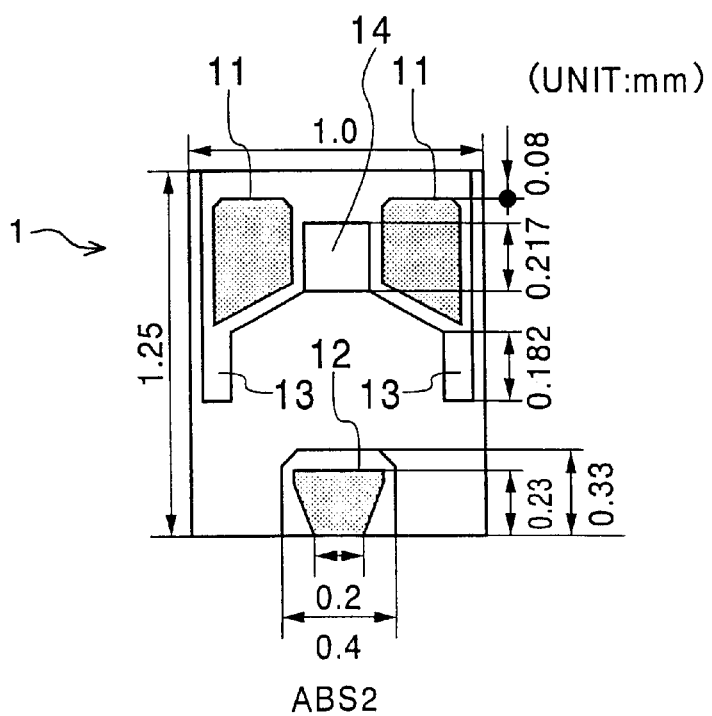
FIG. 18 is a plan view showing a floating surface shape ABS2 of the magnetic head slider in accordance with the second embodiment of the present invention.

Next, a description will be given of the dimple position, the step depth δs and the recess depth δr of the magnetic head slider assembly in accordance with the second embodiment of the present invention. FIG. 18 shows a floating surface shape (hereinafter, referred to as ABS2) of the magnetic head slider in accordance with the second embodiment of the present invention. The ABS2 of the second embodiment 2 is structured such that a pair of side rails 13 formed along both sides are provided, thereby increasing an area of a portion functioning as the negative pocket 14. Accordingly, the negative pressure generated by the negative pressure pocket 14 is increased in comparison with the ABS1 of the first embodiment, thereby moving the dimple position Xp at which the values Δhin–out and Δh0–3 become simultaneously zero close to the center position of mass 0.5 of the slider. In other words, in order to improve the floating stability against disturbance, it is necessary to move the dimple position Xp at which the values Δhin–out and Δh0–3 become simultaneously zero close to the center position of mass 0.5 of the slider, and in order to move the dimple position Xp at which the values Δhin–out and Δh0–3 become simultaneously zero close to the center position of mass 0.5 of the slider, the negative pressure generated by the negative pocket 14 is made large.

Figure 19:
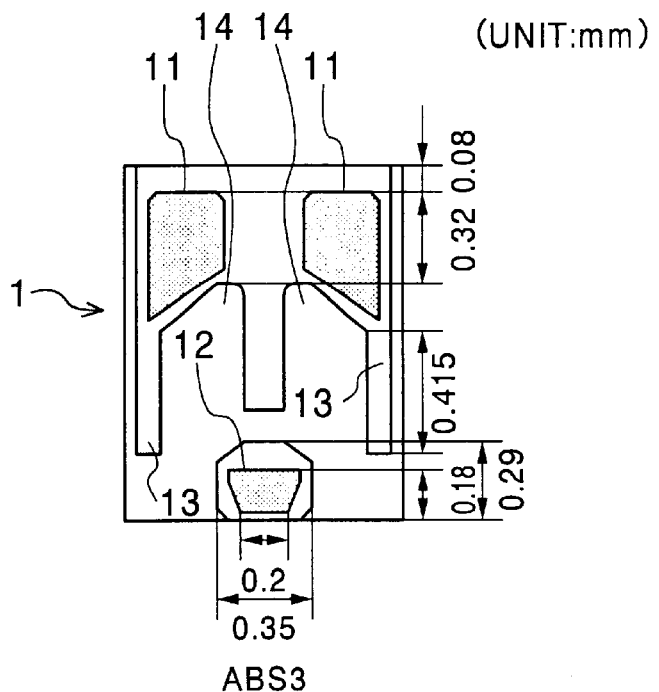
FIG. 19 is a plan view showing another floating surface shape ABS3 of the magnetic head slider in accordance with the second embodiment of the present invention.

FIG. 19 shows another floating surface shape (hereinafter, referred to as ABS3) of the magnetic head slider in accordance with the second embodiment of the present invention. The ABS3 is structured such that a pair of side rails 13 formed along both sides have a length made larger than that of the ABS2, thereby increasing an area of a portion functioning as the negative pocket 14 so as to move the dimple position Xp at which the values Δhin–out and Δh0–3 become simultaneously zero close to the center position of mass 0.5 of the slider.

Figure 20:
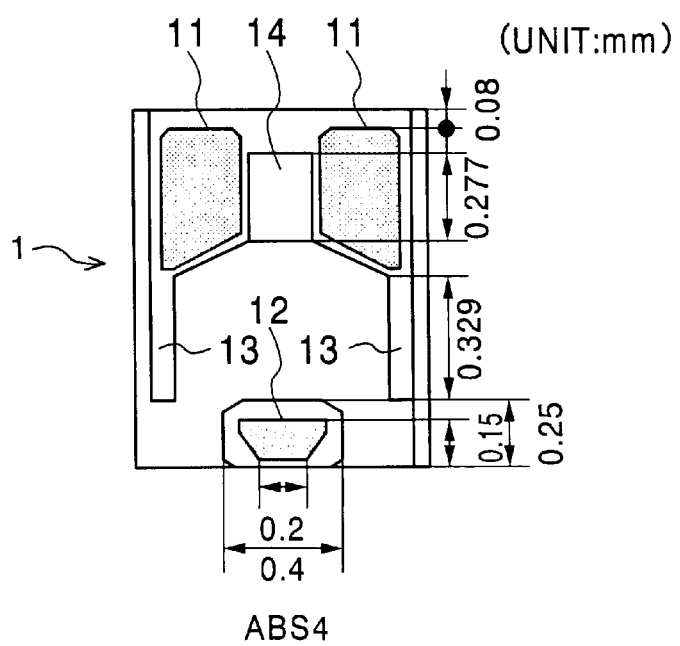
FIG. 20 is a plan view showing the other floating surface shape ABS4 of the magnetic head slider in accordance with the second embodiment of the present invention.

FIG. 20 shows the other floating surface shape (hereinafter, referred to as ABS4) of the magnetic head slider in accordance with the second embodiment of the present invention. The ABS4 is structured such that the inflow pad area is made larger than that of the ABS2 and ABS3 and a pair of side rails 13 formed along both sides have a length which is made larger than that of the ABS2, thereby increasing an area of a portion functioning as the negative pocket 14 so as to increase the negative pressure and the floating amount of the floating pad. In accordance with the structure mentioned above, it is possible to move the dimple position Xp at which the values Δhin−out and Δh0−3 become simultaneously zero close to the center position of mass 0.5 of the slider.

Figure 21:
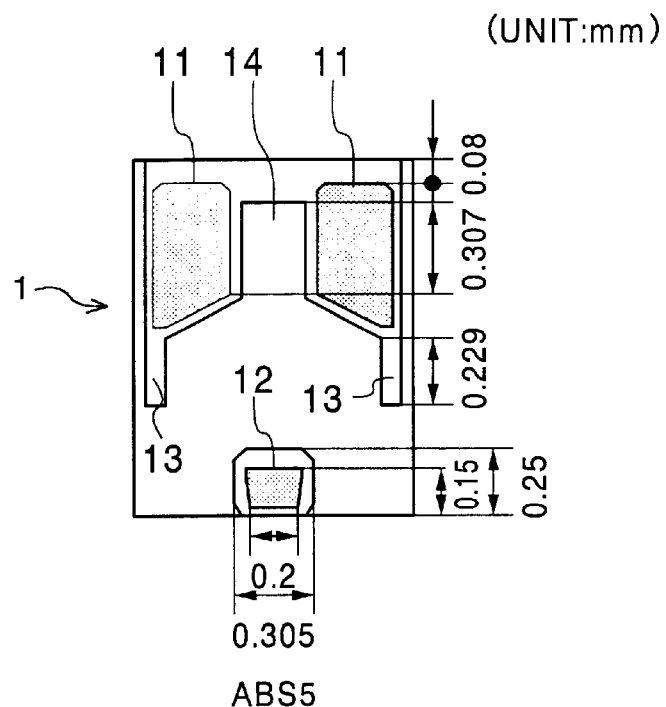
FIG. 21 is a plan view showing the other floating surface shape ABS5 of the magnetic head slider in accordance with the second embodiment of the present invention.

FIG. 21 shows the other floating surface shape (hereinafter, referred to as ABS5) of the magnetic head slider in accordance with the second embodiment of the present invention. The ABS5 is structured such that the inflow pad area is made larger than that of the ABS2–ABS4 and a pair of side rails 13 formed along both sides have a length made larger than that of the ABS2, thereby increasing an area of a portion functioning as the negative pocket 14 so as to increase the negative pressure and the floating amount of the floating pad. In accordance with the structure mentioned above, it is possible to move the dimple position Xp at which the values Δhin−out and Δh0−3 become simultaneously zero close to the center position of mass 0.5 of the slider.

In this case, a length L in a longitudinal direction (an air inflow direction) of the ABS1–ABS5 is set to 1.25 mm and a length w in a short length direction (a direction perpendicular to the longitudinal direction) is set to 1.0 mm.

Figure 22:
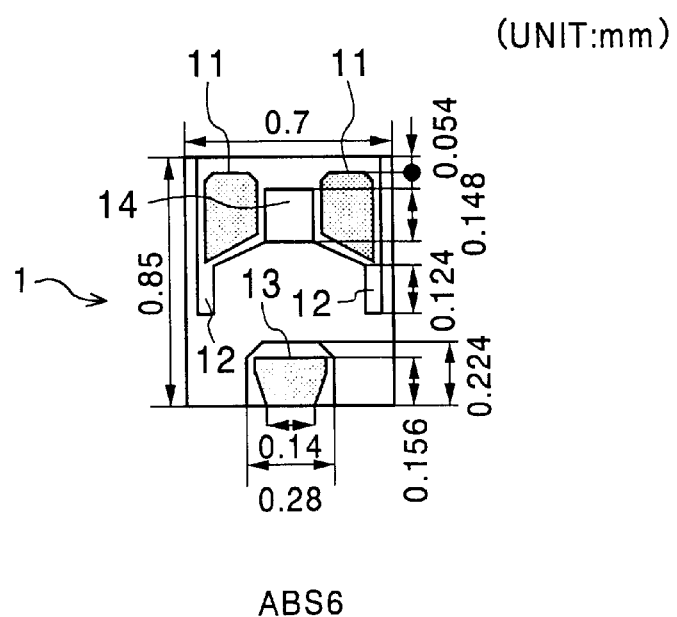
FIG. 22 is a plan view showing the other floating surface shape ABS6 of the magnetic head slider in accordance with the second embodiment of the present invention.

FIG. 22 shows the other floating surface shape (hereinafter, referred to as ABS6) of the magnetic head slider in accordance with the second embodiment of the present invention. A size of the ABS6 is obtained by reducing the length L in the longitudinal direction of the ABS1–ABS5 at 0.68 times and the length w in the short length direction to 0.7 times, and shapes of the inflow pad 11 and the outflow pad 12 are obtained by reducing the shapes of the inflow pad 11 and the outflow pad 12 of the ABS2 to 0.68 times in the longitudinal direction and 0.7 times in the short length direction in an analogous manner. By reducing a distance (L−xp) between the dimple position xp (mm) and the outflow end as mentioned above, it is possible to move the dimple position Xp at which the values Δhin−out and Δh0−3 become simultaneously zero close to the center position of mass 0.5 of the slider.

Figure 23:
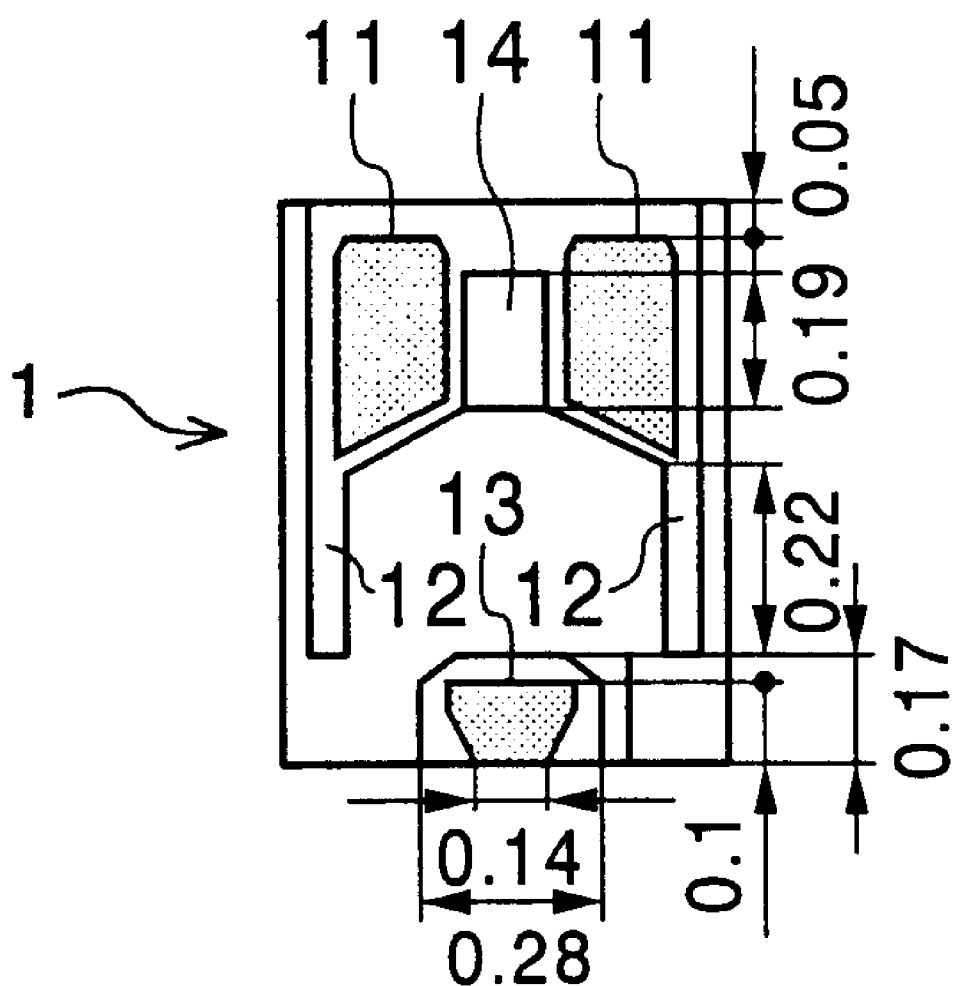
FIG. 23 is a plan view showing the other floating surface shape ABS7 of the magnetic head slider in accordance with the second embodiment of the present invention.

FIG. 23 shows the other floating surface shape (hereinafter, referred to as ABS7) of the magnetic head slider in accordance with the second embodiment of the present invention. A size of the ABS7 is obtained by reducing the length L in the longitudinal direction of the ABS1–ABS5 at 0.68 times and the length w in the short length direction to 0.7 times, and shapes of the inflow pad 11 and the outflow pad 12 are obtained by reducing the shapes of the inflow pad 11 and the outflow pad 12 of the ABS4 to 0.68 times in the longitudinal direction and 0.7 times in the short length direction in an analogous manner. By reducing a distance (L−xp) between the dimple position xp (mm) and the outflow end as mentioned above and increasing the length of a pair of side rails 13 formed along both sides in comparison with that of the ABS6 so as to increase the area of the portion functioning as the negative pressure pocket 14 and increasing the negative pressure, it is possible to move the dimple position Xp at which the values Δhin−out and Δh0−3 become simultaneously zero close to the center position of mass 0.5 of the slider.

Figures 24A, 24B:
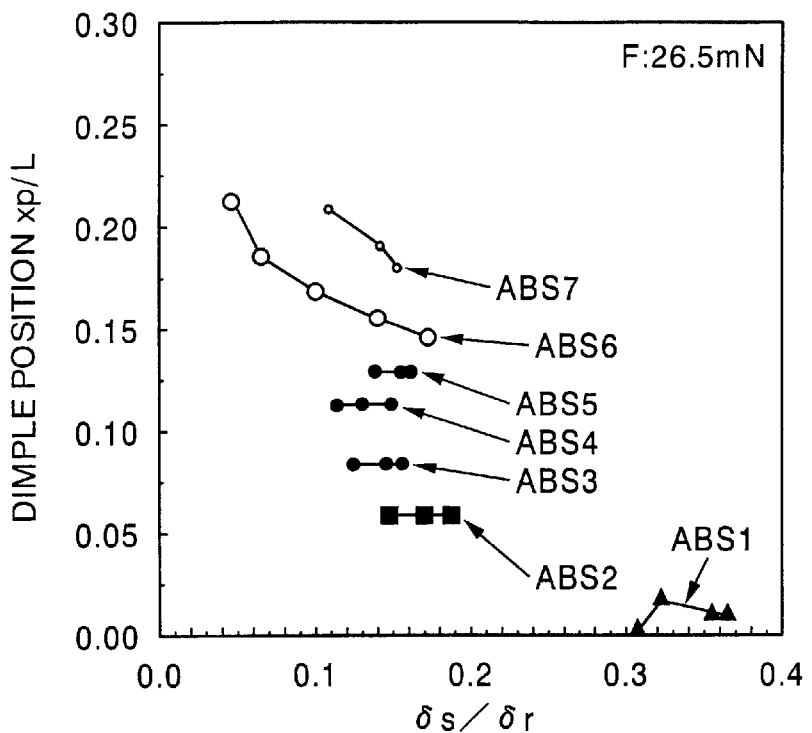
FIGS. 24A and 24B are graphs showing a dimple position with respect to a ratio between a step depth and a recess depth when a difference of floating amount of a floating profile in the magnetic head slider in accordance with the first and second embodiments of the present invention and a reduction of floating amount due to the change of an atmospheric pressure in the periphery of the slider become simultaneously zero, and an outflow end floating amount with respect to the ratio between the step depth and the recess depth.

By using the floating surface shapes ABS1–ABS7, under the condition that the pressing load F is uniformly set to 26.5 mN, the dimple position Xp and the outflow end floating amount h2 are calculated with respect to the ratio δs/δr between the step depth δs and the recess depth δr at which the values Δhin−out and Δh0−3 become simultaneously zero. The obtained results are shown in FIGS. 24A and 24B.

On the basis of the drawings, the outflow end floating amount h2 is reduced except the ABS1 when the ratio δs/δr is made small, however, the value Xp becomes constant except the ABS1, ABS6 and ABS7. The value Xp becomes larger in the order of ABS1, ABS2, ABS3, ABS3, ABS4, ABS5, ABS6 and ABS7 so as to become close to the center position of mass 0.5 of the slider. This result coincides with a design policy for the ABS1–ABS7.

Figure 25:
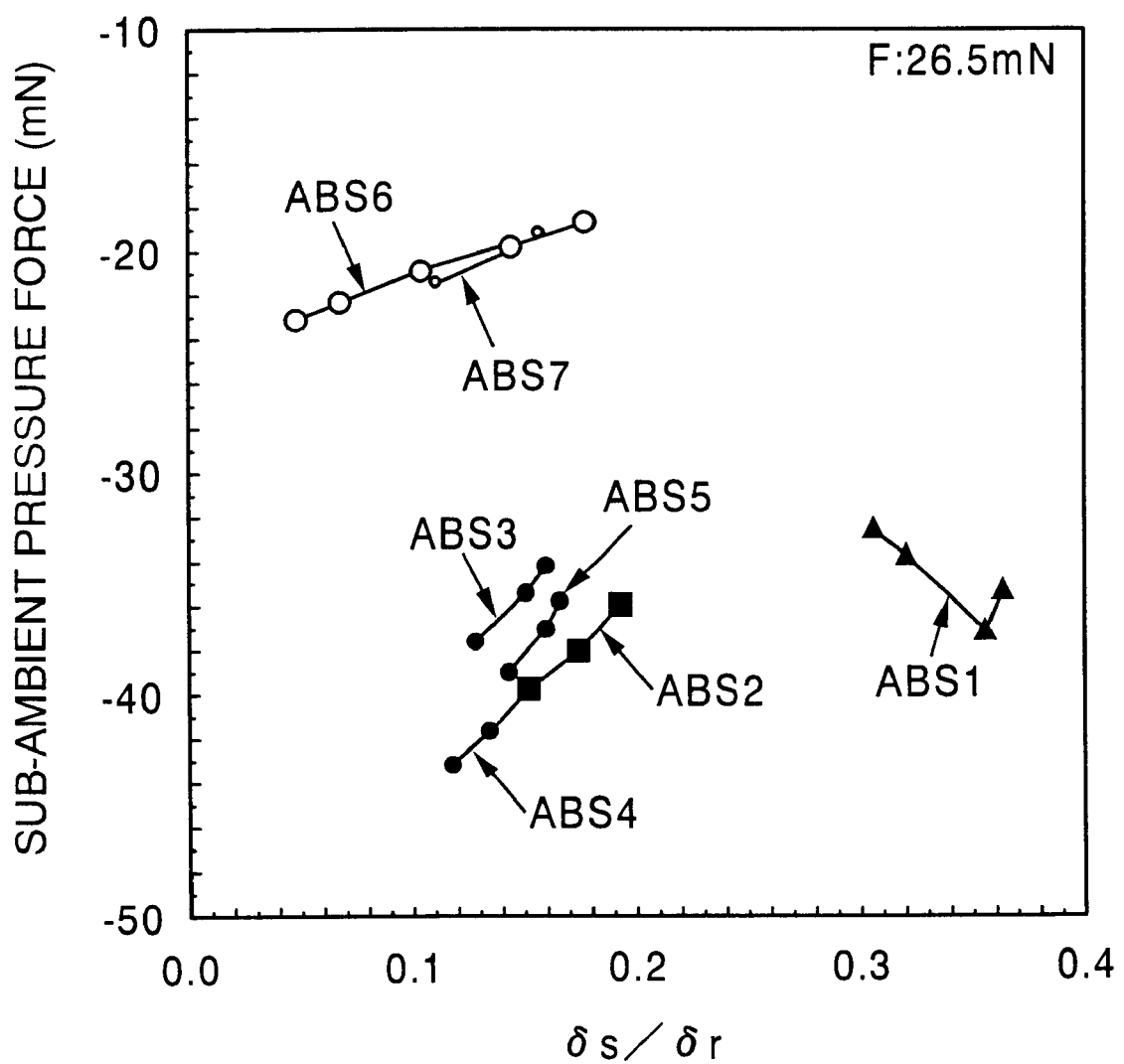
FIG. 25 is a graph showing a negative pressure in a condition of a height 0 mm and an innermost periphery with respect to a ratio between a step depth and a recess depth when a difference of floating amount of a floating profile in the magnetic head slider in accordance with the first and second embodiments of the present invention and a reduction of floating amount due to the difference of an atmospheric pressure in the periphery of the slider become simultaneously zero.

FIG. 25 shows a negative pressure (sub-ambient pressure force) under the condition of the height 0 mm and the innermost periphery with respect to the ratio δs/δr between the step depth δs and the recess depth δr at which the values Δhin−out and Δh0−3 become simultaneously zero, under the condition that the pressing load F is uniformly set to 26.5 mN, by using the floating surface shapes ABS1–ABS7. On the basis of the drawings, in the case of the ABS1, the absolute value of the negative pressure (sub-ambient pressure force) is reduced when the ratio δs/δr is made small, however, in the case of the ABS2 to ABS7, the absolute value of the negative pressure (sub-ambient pressure force) is increased when the ratio δs/δr is made small. In the case that the ratio δs/δr is constant, the absolute value of the negative pressure (sub-ambient pressure force) is largest in the ABS4. The ABS4 is structured such that the area of the negative pressure (sub-ambient pressure force) pocket 14 surrounded by a pair of side rails 13 formed along both sides is the greatest, and this result coincides with a design policy for the ABS2 to ABS7.

Next, a description will be given of a range of the dimple position Xp and the ratio δs/δr between the step depth δs and the recess depth δr with respect to the target specification of the magnetic head slider assembly in accordance with the first and second embodiments of the present invention. In this case, it is desirable that the target specification of the difference of floating amount of the floating profile is set to be equal to or less than 1 nm, preferably equal to or less than 0.8 nm, in the case that the relation xp≦0.5 is established, and equal to or less than 3 nm in the case that the relation 0.5<xp/L is established. Accordingly, the inventors have considered about the condition for making the difference of floating amount equal to or less than 0.8 nm or equal to or less than 3 nm.

Figure 26:
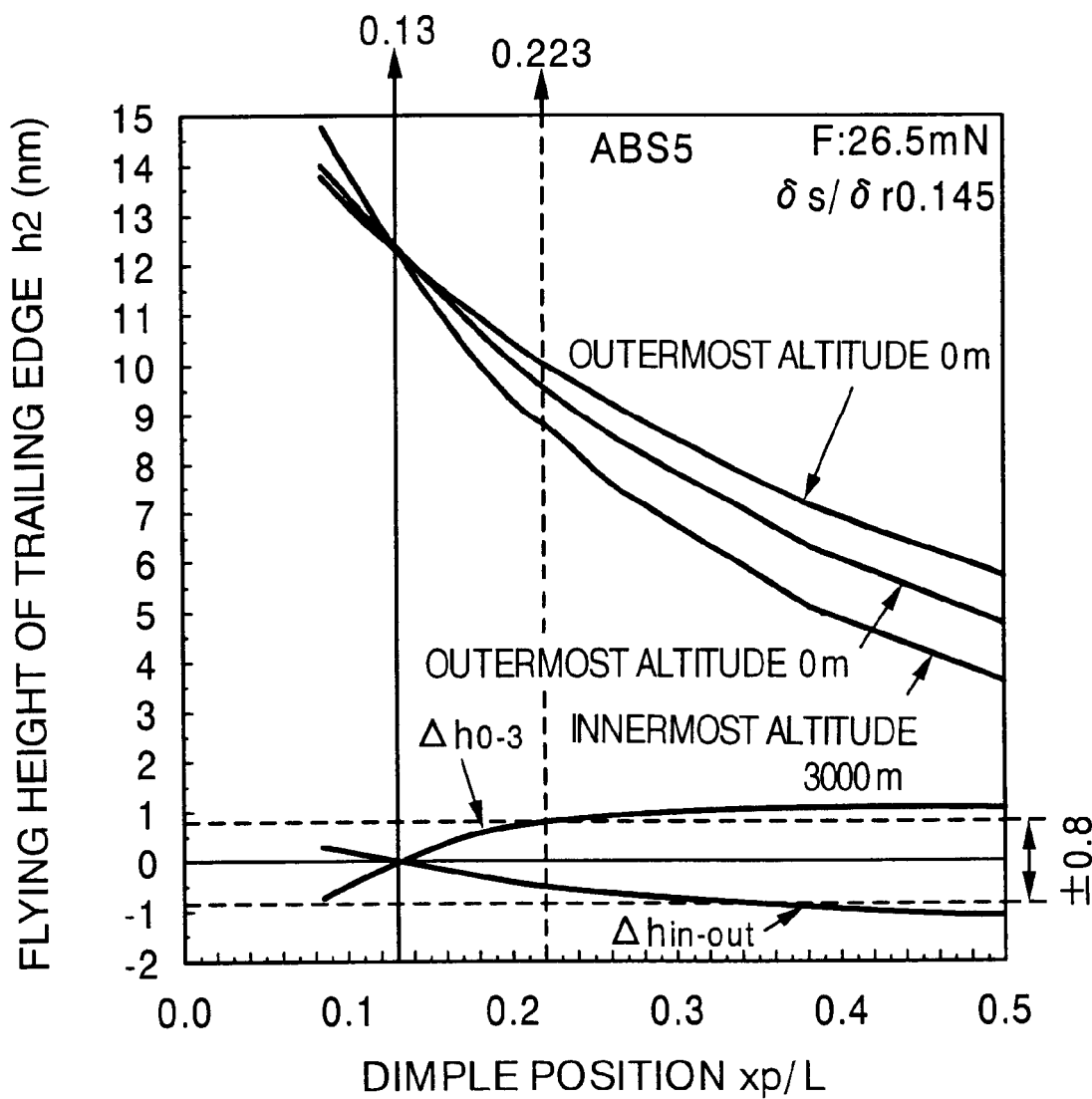
FIG. 26 is a graph showing a difference of floating amount between the dimple position and the floating profile and a reduction of floating amount due to an atmospheric pressure change in the periphery of the slider, in a condition of setting the pressing load F and a ratio δs/δr between the step depth δs and the recess depth δr to be uniform of 26.5 mN and 0.145 respectively, with respect to the floating surface shape ABS5 of the second embodiment of the present invention.

The difference of floating amount Δhin−out of the floating profile with respect to the dimple position Xp and the reduction of floating amount Δh0−3 due to the atmospheric pressure change in the periphery of the slider are calculated under the condition that the pressing load F and the ratio δs/δr between the step depth δs and the recess depth δr are uniformly set to 26.5 mN and 0.145, by using the floating surface shape ABS5. The obtained result is shown in FIG. 26. On the basis of the drawing, when the dimple position satisfies the relation Xp (=xp/L)=0.223, the absolute values of Δhin−out and Δh0−3 become simultaneously equal to ore less than 0.8, and when the relation Xp=0.13 is established, the values Δhin−out and Δh0−3 become simultaneously zero. Accordingly, in order to make the absolute values of Δhin−out and Δh0−3 become simultaneously zero, it is necessary to set the value Xp in a range 0.13≦Xp≦0.223.

Figure 27:
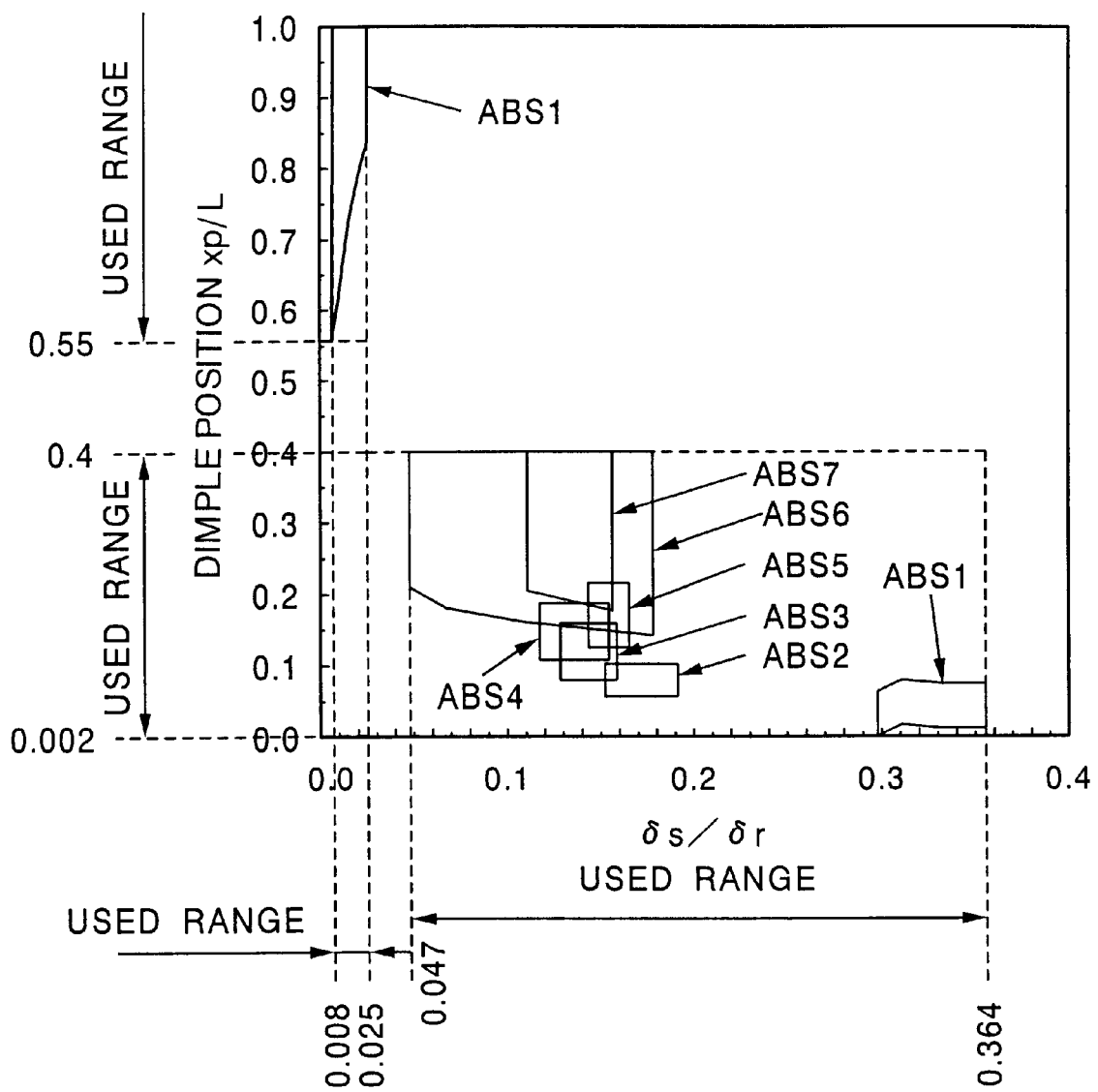
FIG. 27 is a graph showing a ratio between the step depth and the recess depth and a range of the dimple position of the difference of floating amount of the floating profile and the reduction of floating amount due to the atmospheric pressure change in the periphery of the slider in the magnetic head slider in accordance with the first and second embodiments of the present invention, with respect to a target specification.

FIG. 27 shows a result obtained by calculating the range of the ratio δs/δr between the step depth δs and the recess depth δr and the dimple position Xp required for the matter that the absolute values of Δhin−out and Δh0−3 become simultaneously equal to or less than 0.8 nm, in the floating surface shapes ABS1 to ABS4 and ABS6 to ABS7 by using the same method as that applied to the ABS5 mentioned above.

Further, FIG. 27 shows the range of the ratio δs/δr between the step depth δs and the recess depth δr and the dimple position Xp (≧0.5) required for the matter that the absolute values of Δhin–out and Δh0–3 become simultaneously equal to or less than 3 nm, in the floating surface shape ABS1, by using the calculated result in FIG. 14A.

On the basis of the results shown in FIG. 27, in order to make the difference of floating amount equal to or less than 0.8 nm or equal to or less than 3 nm, the used ranges of the ratio δs/δr and the value Xp are shown by the following two ranges. That is, they are a range of 0.047≦δs/δr≦0.364 and 0.002≦Xp≦0.4, and a range of 0.008≦δs/δr ≦0.025 and 0.55≦Xp.

Figure 28:
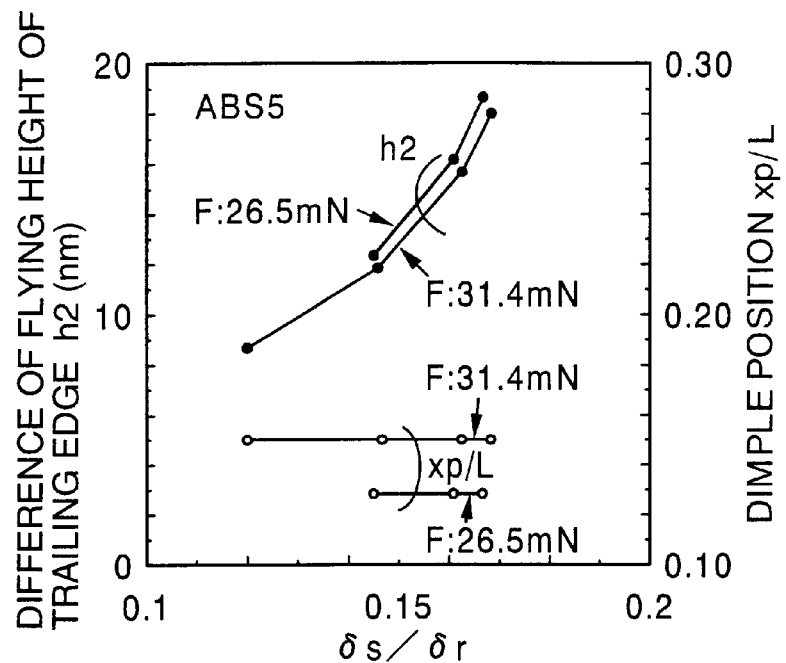
FIG. 28 is a graph showing an effect in the case that a pressing load of the magnetic head slider in accordance with the second embodiment of the present invention is changed.

FIG. 28 shows the outflow end floating amount h2 with respect to the ratio δs/δr between the step depth δs and the recess depth δr and the dimple position Xp at which the values Δhin–out and Δh0–3 become simultaneously zero, in the case of changing the pressing load F from 26.5 mN to 31.4 mN, and using the floating surface shape ABS5. On the basis of the drawing, it is known that the value h2 becomes small by increasing the pressing load F, however, the dimple position Xp at which the values Δhin–out and Δh0–3 become simultaneously zero becomes larger, and moves close to the center position of mass 0.5 of the slider.

Figure 29:
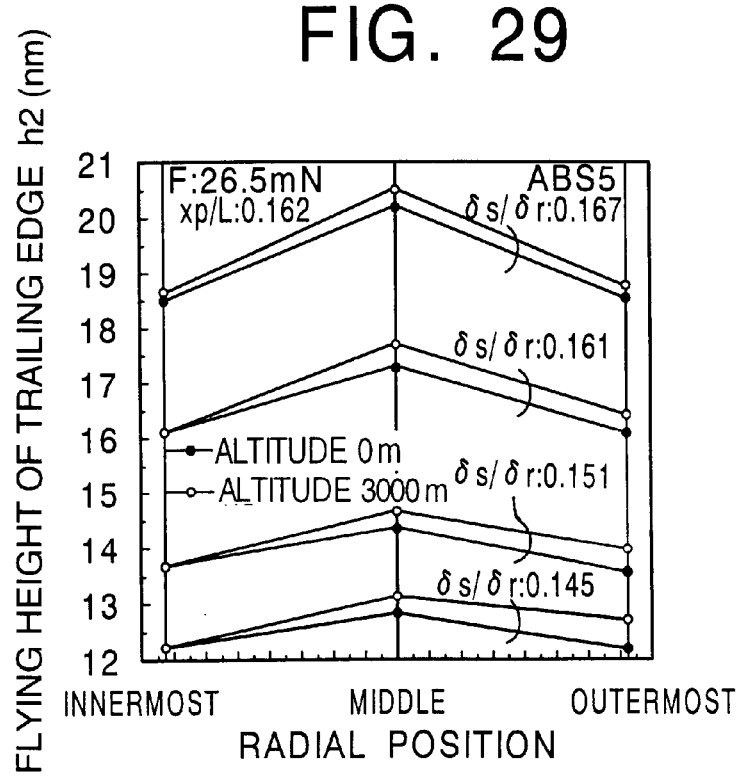
FIG. 29 is a graph showing a floating profile corresponding to a floating characteristic of the floating surface shape ABS5.

FIG. 29 shows the outflow end floating amount h2 (the floating profile) under the conditions of the innermost periphery, the middle periphery and the outermost periphery at the heights 0 m and 3 km in the case that the ratio δs/δr between the step depth δs and the recess depth δr at which the values Δhin–out and Δh0–3 become simultaneously zero is 0.145, 0.151, 0.161 and 0.167, and the dimple position Xp is 0.162, under the condition that the pressing load F is uniformly set to 26.5 mN, by using the floating surface shape ABS5. On the basis of the drawing, it is known that both of the conditions that the difference of floating amount of the floating profile is equal to or less than 2 nm and that the reduction of floating amount due to the atmospheric pressure change in the periphery of the slider is equal to or less than 2 nm at the height 3 km are simultaneously satisfied.

Figure 30:
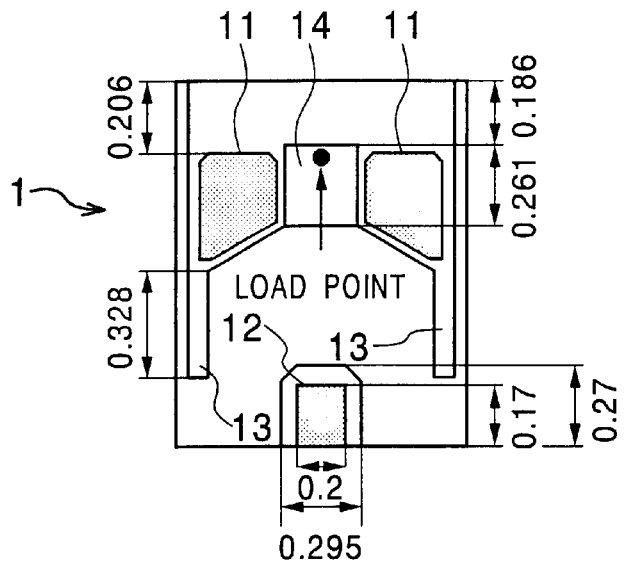
FIG. 30 is a plan view showing the other floating surface shape ABS51 of the magnetic head slider in accordance with the second embodiment of the present invention.

FIG. 30 shows the other floating surface shape (hereinafter, referred to as ABS51) of the magnetic head slider in accordance with the second embodiment of the present invention.

Figure 31:
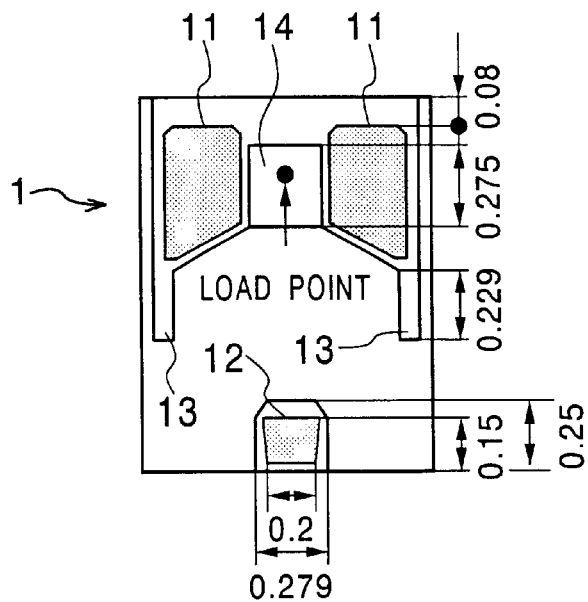
FIG. 31 is a plan view showing the other floating surface shape ABS52 of the magnetic head slider in accordance with the second embodiment of the present invention.

FIG. 31 shows the other floating surface shape (hereinafter, referred to as ABS52) of the magnetic head slider in accordance with the second embodiment of the present invention.

Figure 32:
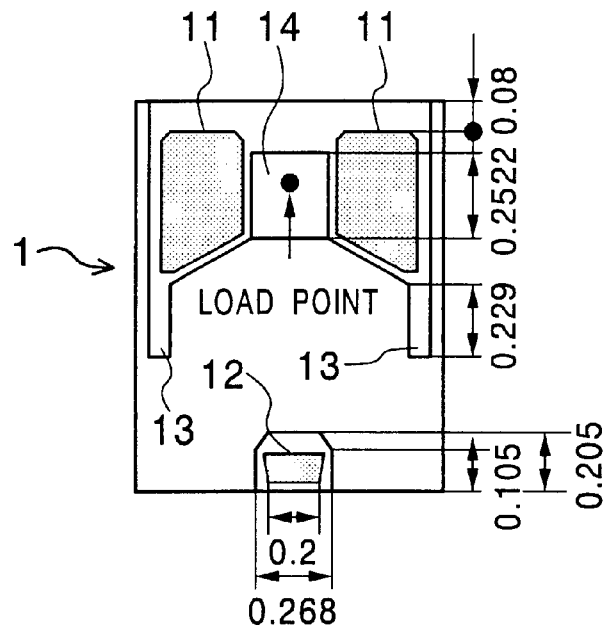
FIG. 32 is a plan view showing the other floating surface shape ABS53 of the magnetic head slider in accordance with the second embodiment of the present invention.

FIG. 32 shows the other floating surface shape (hereinafter, referred to as ABS53) of the magnetic head slider in accordance with the second embodiment of the present invention.

Figure 33:
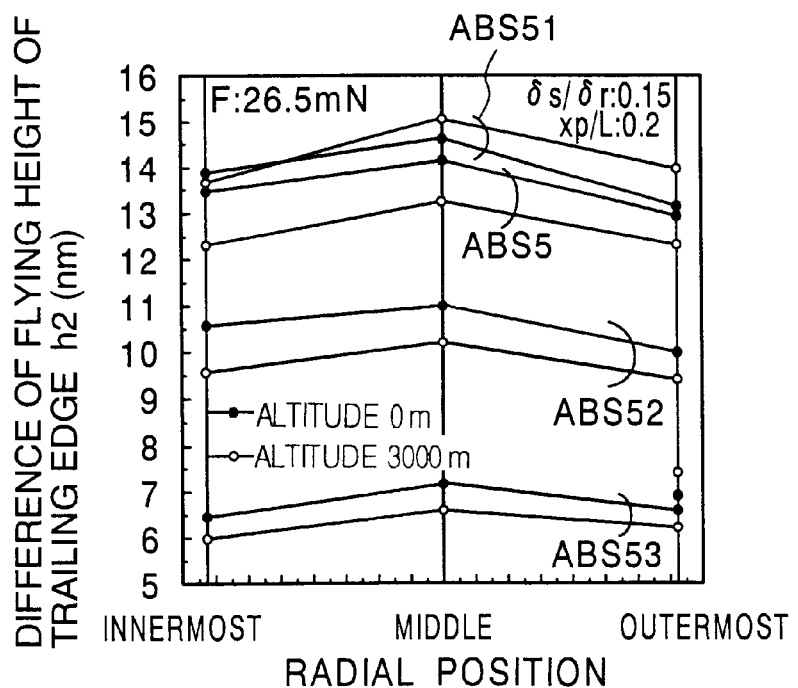
FIG. 33 is a plan view showing the other floating surface shape ABS5 of the magnetic head slider in accordance with the second embodiment of the present invention.

FIG. 33 shows the outflow end floating amount h2 (the floating profile) under the conditions of the innermost periphery, the middle periphery and the outermost periphery at the heights 0 m and 3 km, under the condition that the pressing load F is uniformly set to 26.5 mN, the dimple position Xp is uniformly set to 0.2 and the ratio δs/δr between the step depth δs and the recess depth δr is uniformly set to 0.15, by using the floating surface shapes ABS5, and ABS51 to ABS53. On the basis of the drawing, it is known that both of the conditions that the difference of floating amount of the floating profile is equal to or less than 2 nm and that the reduction of floating amount due to the atmospheric pressure change in the periphery of the slider is equal to or less than 2 nm at the height 3 km simultaneously satisfied. In particular, in the ABS51, the value h2 reducing at the height 3 km becomes equal to or less than 2 nm by moving the floating surface to the outflow surface side. This is because an effect of moving the dimple position to the inflow side is equivalent to an effect of moving the floating surface to the outflow side.

Figure 34A:
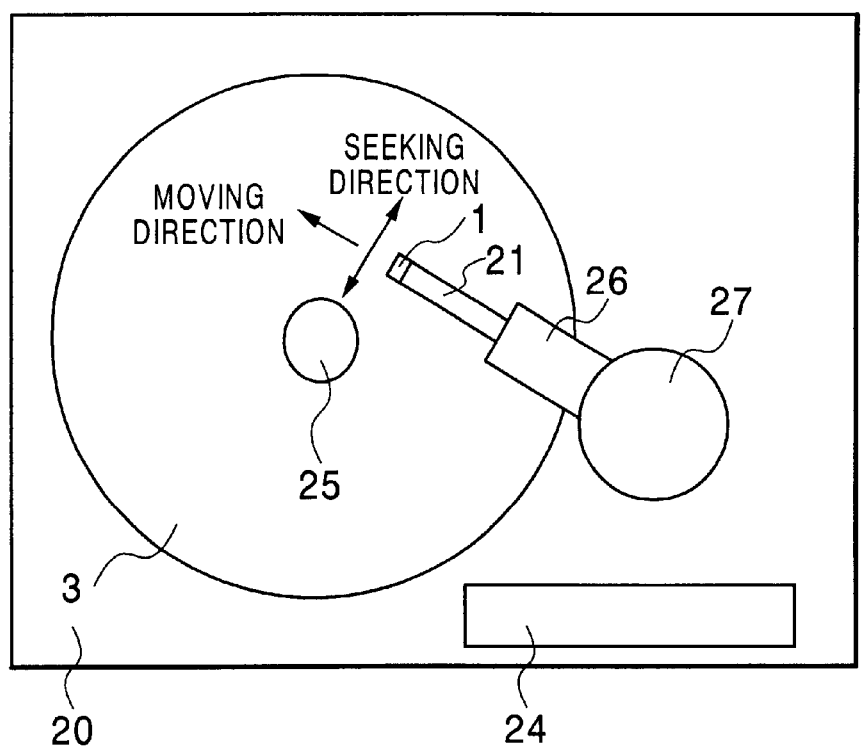
FIGS. 34A and 34B are a plan view and a side elevational view showing an embodiment of a magnetic disk apparatus in accordance with the present invention.
Figure 34B:
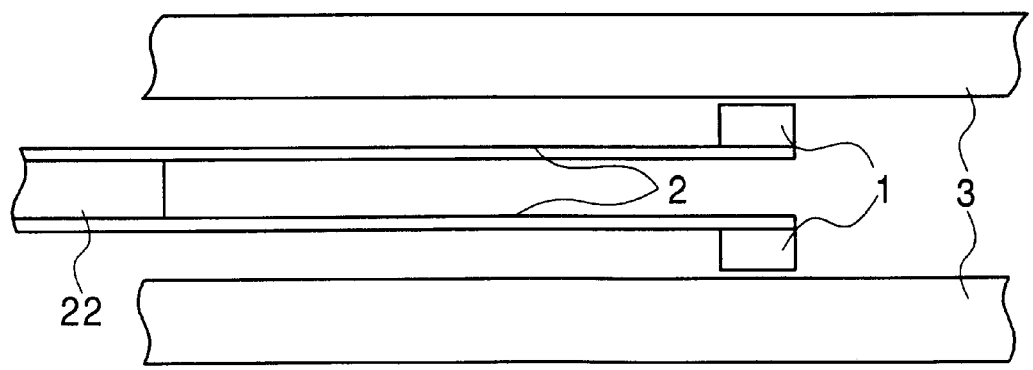

FIGS. 34A and 34B show an embodiment of a magnetic disk apparatus to which the present invention is applied. The illustrated magnetic disk apparatus is constituted by a magnetic recording medium (disk) 3, a drive portion 25 for rotating the disk, the magnetic head slider 1 and the support body 21 thereof in accordance with the embodiments of the present invention, a supporting arm 26 for positioning and a drive portion 27 thereof, and a circuit 24 processing recording and reproducing signals of the magnetic head mounted on the slider 1. FIGS. 34A and 34B are respectively a plan view and a side elevational view of a state that the slider 1 travels and seeks in a state of floating on the recording medium surface 3.

In accordance with the embodiment mentioned above, since the floating amount change can be reduced with respect to both of the peripheral speed change due to the difference of radial position between the disk innermost periphery and the outermost periphery and the change of yaw angle showing the air inflow angle, and the difference of floating amount of the flowing profile can satisfy the range equal to or less than 0.8 nm, it is possible to reduce the change of contact force from the innermost periphery to the outermost periphery at a time of being in floating contact, and make the track recording density from the innermost periphery to the outermost periphery constant. Accordingly, since it is possible to efficiently increase the recording capacity per one disk, there is an effect that it is possible to provide the magnetic disk slider assembly and the magnetic disk apparatus which are excellent in the recording capacity.

In accordance with the present invention, it is possible to reduce the change of contact force from the innermost periphery to the outermost periphery at a time of being in floating contact, and it is possible to make the track recording density from the innermost periphery to the outermost periphery constant.

What is claimed is:

1. A magnetic head slider assembly comprising:

a magnetic head slider provided with an inflow pad and an outflow pad on an opposing side thereof to a magnetic disk surface, and with two stepped surfaces formed on the opposing side via a difference portion and disposed in a direction apart from the magnetic disk surface with respect to contact surfaces of the inflow pad and the outflow pad; and a support body for supporting the magnetic head slider on the magnetic disk surface, which is provided with a dimple for applying a load to the magnetic head slider, wherein a ratio δs/δr between a depth δs from the contact surfaces to the first stepped surface and a depth δr from the contact surfaces to the second stepped surface is set in a range satisfying a condition shown by 0.047≦δs/δr ≦0.364, and a ratio xp/L between a length L of the magnetic head slider in an air stream inflow direction and a distance xp between an air stream inflow end of the magnetic head slider and a dimple position is set in a range satisfying a condition shown by 0.002≦xp/L≦0.4.

2. A magnetic head slider assembly comprising:

a magnetic head slider provided with an inflow pad and an outflow pad on an opposing side thereof to a magnetic disk surface, and with two stepped surfaces formed on the opposing side via a difference portion and disposed in a direction apart from the magnetic disk surface with respect to contact surfaces of the inflow pad and the outflow pad; and a support body for supporting the magnetic head slider on the magnetic disk surface, which is provided with a dimple for applying a load to the magnetic head slider, wherein a ratio $\delta s/\delta r$ between a depth $\delta s$ from the contact surfaces to the first stepped surface and a depth $\delta r$ from the contact surfaces to the second stepped surface is set in a range satisfying a condition shown by $0.008 \leqq \delta s/\delta r \leqq 0.025$, and a ratio xp/L between a length L of the magnetic head slider in an air stream inflow direction and a distance xp between an air stream inflow end of the magnetic head slider and a dimple position is set in a range satisfying a condition shown by $0.55 \leqq xp/L$.

3. A magnetic disk apparatus comprising:

magnetic disk to be rotated;

a magnetic head slider provided with a magnetic head performing one or both of writing and reading of data with respect to the magnetic disk;

a support body for supporting the magnetic head slider; and a drive portion positioning the magnetic head via the support body, wherein a magnetic head slider assembly constituted by the magnetic head slider and the support body are the magnetic head slider assembly as claimed in claim 1 or 2.

* * * * *